US011895708B2

(12) United States Patent
Lei et al.

(10) Patent No.: US 11,895,708 B2
(45) Date of Patent: Feb. 6, 2024

(54) SIGNALING SUPPORT AND RESOURCE MAPPING FOR 2-STEP RACH

(71) Applicants: QUALCOMM Incorporated, San Diego, CA (US); Jing Lei, San Diego, CA (US); Seyong Park, San Diego, CA (US); Joseph Binamira Soriaga, San Diego, CA (US); Yi Huang, San Diego, CA (US); Yiqing Cao, Beijing (CN); Tingfang Ji, San Diego, CA (US); Juan Montojo, San Diego, CA (US); Peter Gaal, San Diego, CA (US); Wanshi Chen, San Diego, CA (US)

(72) Inventors: Jing Lei, San Diego, CA (US); Seyong Park, San Diego, CA (US); Joseph Binamira Soriaga, San Diego, CA (US); Yi Huang, San Diego, CA (US); Yiqing Cao, Beijing (CN); Tingfang Ji, San Diego, CA (US); Juan Montojo, San Diego, CA (US); Peter Gaal, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 400 days.

(21) Appl. No.: 17/414,135

(22) PCT Filed: Dec. 18, 2018

(86) PCT No.: PCT/CN2018/121827
§ 371 (c)(1),
(2) Date: Jun. 15, 2021

(87) PCT Pub. No.: WO2020/124380
PCT Pub. Date: Jun. 25, 2020

(65) Prior Publication Data
US 2022/0095378 A1 Mar. 24, 2022

(51) Int. Cl.
*H04W 74/08* (2009.01)
*H04W 74/00* (2009.01)

(52) U.S. Cl.
CPC ..... *H04W 74/0833* (2013.01); *H04W 74/006* (2013.01)

(58) Field of Classification Search
CPC .............. H04W 72/042; H04W 76/27; H04W 74/0833; H04W 74/006
See application file for complete search history.

(56) References Cited

U.S. PATENT DOCUMENTS

| 2017/0353976 A1 | 12/2017 | Yerramalli et al. |
| 2018/0070335 A1 | 3/2018 | Amuru et al. |

(Continued)

FOREIGN PATENT DOCUMENTS

| CN | 108271275 A | 7/2018 |
| TW | 201342821 A | 10/2013 |

(Continued)

OTHER PUBLICATIONS

Supplementary European Search Report—EP18944103—Search Authority—The Hague—dated Jun. 3, 2022.

(Continued)

*Primary Examiner* — Siming Liu
(74) *Attorney, Agent, or Firm* — Holland & Hart LLP

(57) ABSTRACT

Methods, systems, and devices for wireless communications are described. A user equipment (UE) may receive an indication of a resource configuration for a random access (RA) procedure. The resource configuration may identify multiple sets of transmission resources corresponding to multiple radio resource control (RRC) states. The UE may identify an RRC state and may determine a set of transmission resources and/or a transport format based on the indication of the resource configuration, the identified RRC (Continued)

state, and/or a UE identifier (UE ID). The UE may transmit a first RA procedure message (e.g., a msgA) using the determined transmission resources and/or transport format. The base station may receive the message and may identify the RRC state of the UE based on the first message and transmitted indication of the resource configuration. The base station may transmit a second RA procedure message (e.g., a msgB), which the UE may receive.

30 Claims, 20 Drawing Sheets

(56) References Cited

U.S. PATENT DOCUMENTS

| | | |
|---|---|---|
| 2018/0116000 A1 | 4/2018 | Ly et al. |
| 2018/0124626 A1* | 5/2018 | Tsai ............... H04L 25/0202 |
| 2018/0132282 A1 | 5/2018 | Ly et al. |
| 2018/0263063 A1 | 9/2018 | Islam et al. |
| 2018/0279375 A1 | 9/2018 | Jeon et al. |

FOREIGN PATENT DOCUMENTS

| | | |
|---|---|---|
| WO | WO-2013166591 A1 | 11/2013 |
| WO | WO-2018135631 A1 | 7/2018 |

OTHER PUBLICATIONS

Panasonic: "Configuration of DL Control Resource Set and UE Bandwidth", 3GPP Draft, 3GPP TSG-RAN WG1 NR AdHoc, R1-1700639, 3rd Generation Partnership Project (3GPP), Mobile Competence Centre, 650, Route Des Lucioles, F-06921 Sophia-Antipolis Cedex, France, vol. RAN WG1, No. Spokane, USA, Jan. 16, 2017-Jan. 20, 2017, Jan. 16, 2017 (Jan. 16, 2017), 5 pages, XP051208164.

International Search Report and Written Opinion—PCT/CN2018/121827—ISA/EPO—dated Sep. 18, 2019.

VIVO: "RAN2 Impacts of 2-step RACH", 3GPP Draft, R2-1818260, RAN2 Impacts of 2-step RACH, 3GPP TSG-RAN WG2 Meeting #104, 3rd Generation Partnership Project (3GPP), Mobile Competence Centre, 650, Route Des Lucioles, F-06921, Sophia-Antipolis Cedex, France, vol. RAN WG2, No. Spokane, USA, Nov. 12, 2018-Nov. 16, 2018, Nov. 12, 2018 (Nov. 12, 2018), XP051557761, 5 pages, Retrieved from the Internet: URL: http://www.3gpp.org/ftp/Meetings%5F3GPP%5FSYNC/RAN2/Docs/R2%2D1818260%2Ezip [retrieved on Nov. 12, 2018], Sections 1 and 2, p. 1-p. 4.

* cited by examiner

SIGNALING SUPPORT AND RESOURCE MAPPING FOR 2-STEP RACH

CROSS REFERENCE TO RELATED APPLICATION

The present Application is a 371 national phase filing of International Patent Application No. PCT/CN2018/121827 by Lei et al., entitled "SIGNALING SUPPORT AND RESOURCE MAPPING FOR 2-STEP RACH," filed Dec. 18, 2018, which is assigned to the assignee hereof, and which is expressly incorporated by reference in its entirety herein.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some cases, a UE may perform a random access (RA) procedure with a base station. Conventionally, the RA procedure may involve a four-step handshake. For instance, the UE may send a RA preamble to the base station and the base station may send a RA response (RAR) back. The UE may then send a scheduled transmission (a connection request message), and the base station may perform conflict resolution in response, transmitting a connection setup message. In some cases, performing a two-step handshake may decrease latency relative to a four-step handshake.

SUMMARY

The described techniques relate to improved methods, systems, devices, and apparatuses that support signaling support and resource mapping for two-step random access. Generally, the described techniques provide for a user equipment (UE) to receive an indication of a resource configuration for a random access (RA) procedure. The resource configuration may identify multiple sets of transmission resources corresponding to multiple radio resource control (RRC) states. The UE may identify an RRC state and may determine a set of transmission resources based on the indication of the resource configuration and the identified RRC state. The UE may, additionally or alternatively, determine the set of transmission resources based on a UE identifier (UE ID) of the UE. The UE may transmit a first RA procedure message (e.g., a msgA) using the determined transmission resources. The base station may receive the message and may identify the RRC state of the UE based on the first message and transmitted indication of the resource configuration. The base station may transmit a second RA procedure message (e.g., a msgB), which the UE may receive.

A method of wireless communication at a UE is described. The method may include receiving, from a base station, an indication of a resource configuration for a random access procedure, the resource configuration identifying a set of sets of transmission resources corresponding to a set of radio resource control states, identifying a radio resource control state of the UE, determining a set of transmission resources based on the indication of the resource configuration, a transport format, and the identified radio resource control state, and transmitting a first message of the random access procedure to the base station using the determined transmission resources and the transport format.

An apparatus for wireless communication at a UE is described. The apparatus may include a processor, memory in electronic communication with the processor, and instructions stored in the memory. The instructions may be executable by the processor to cause the apparatus to receive, from a base station, an indication of a resource configuration for a random access procedure, the resource configuration identifying a set of sets of transmission resources corresponding to a set of radio resource control states, identify a radio resource control state of the UE, determine a set of transmission resources based on the indication of the resource configuration, a transport format, and the identified radio resource control state, and transmit a first message of the random access procedure to the base station using the determined transmission resources and the transport format.

Another apparatus for wireless communication at a UE is described. The apparatus may include means for receiving, from a base station, an indication of a resource configuration for a random access procedure, the resource configuration identifying a set of sets of transmission resources corresponding to a set of radio resource control states, identifying a radio resource control state of the UE, determining a set of transmission resources based on the indication of the resource configuration, a transport format, and the identified radio resource control state, and transmitting a first message of the random access procedure to the base station using the determined transmission resources and the transport format.

A non-transitory computer-readable medium storing code for wireless communication at a UE is described. The code may include instructions executable by a processor to receive, from a base station, an indication of a resource configuration for a random access procedure, the resource configuration identifying a set of sets of transmission resources corresponding to a set of radio resource control states, identify a radio resource control state of the UE, determine a set of transmission resources based on the indication of the resource configuration, a transport format, and the identified radio resource control state, and transmit a first message of the random access procedure to the base station using the determined transmission resources and the transport format.

Some examples of the method, apparatuses, and non-transitory computer-readable medium described herein may further include operations, features, means, or instructions for identifying at least one transmission parameter to be used by the UE to transmit the first message, where the set of transmission resources may be determined based on the indication of the resource configuration, the transport format, the identified radio resource control state, and the at least one transmission parameter.

Some examples of the method, apparatuses, and non-transitory computer-readable medium described herein may further include operations, features, means, or instructions for determining a UE identifier of the UE based on the identified radio resource control state of the UE, where the set of transmission resources may be determined based on the indication of the resource configuration, the transport format, the identified radio resource control state, and the identifier of the UE.

Some examples of the method, apparatuses, and non-transitory computer-readable medium described herein may further include operations, features, means, or instructions for determining a UE identifier of the UE based on the identified radio resource control state of the UE, and monitoring, based on the determined UE identifier, for a second message of the random access procedure transmitted by the base station in response to the transmitted first message.

Some examples of the method, apparatuses, and non-transitory computer-readable medium described herein may further include operations, features, means, or instructions for determining a search space for a control region of the second message based on the identified radio resource control state of the UE, where the monitoring may be further based on the determined search space.

Some examples of the method, apparatuses, and non-transitory computer-readable medium described herein may further include operations, features, means, or instructions for determining a time duration for at least a portion of the second message based on the identified radio resource control state of the UE, where the monitoring may be further based on the determined time duration.

In some examples of the method, apparatuses, and non-transitory computer-readable medium described herein, the set of sets of transmission resources include at least a first set of transmission resources and a second set of transmissions resources, the first set of transmission resources include a first uplink data portion corresponding to a first subset of a preamble portion, and the second set of transmission resources include a second uplink data portion corresponding to a second subset of the preamble portion.

In some examples of the method, apparatuses, and non-transitory computer-readable medium described herein, the first uplink data portion of the first set of transmission resources and the second uplink data portion of the second set of transmission resources share a common set of frequency resources.

In some examples of the method, apparatuses, and non-transitory computer-readable medium described herein, the first uplink data portion of the first set of transmission resources and the second uplink data portion of the second set of transmission resources share a common set of time resources.

In some examples of the method, apparatuses, and non-transitory computer-readable medium described herein, the first uplink data portion of the first set of transmission resources and the second uplink data portion of the second set of transmission resources share a common set of space resources.

In some examples of the method, apparatuses, and non-transitory computer-readable medium described herein, the preamble portion may include operations, features, means, or instructions for first time resources different from a common set of time resources shared by the first uplink data portion and the second data uplink portion; or first frequency resources different from a common set of frequency resources shared by the first uplink data portion and the second data uplink portion; or first space resources different from a common set of space resources shared by the first uplink data portion and the second data uplink portion; or a combination thereof.

In some examples of the method, apparatuses, and non-transitory computer-readable medium described herein, the preamble portion shares a common set of time resources, or a common set of frequency resources, or a common set of space resources, or a combination thereof, with the first uplink data portion and the second uplink data portion.

In some examples of the method, apparatuses, and non-transitory computer-readable medium described herein, identifying the radio resource control state of the UE may include operations, features, means, or instructions for identifying that the UE may be operating in one of a radio resource control inactive state, or a radio resource control connected state, or a radio resource control idle state.

In some examples of the method, apparatuses, and non-transitory computer-readable medium described herein, receiving the indication of the resource configuration for the random access procedure may include operations, features, means, or instructions for receiving system information, or radio resource control signaling, or a paging signal, or a combination thereof, including the indication of the resource configuration.

In some examples of the method, apparatuses, and non-transitory computer-readable medium described herein, the set of sets of transmission resources include time resources, or frequency resources, or spatial resources, or a combination thereof In some examples of the method, apparatuses, and non-transitory computer-readable medium described herein, the random access procedure may be a two-step random access procedure that may include operations, features, means, or instructions for receiving, in response to the transmitted first message, the second message of the two-step random access procedure.

Some examples of the method, apparatuses, and non-transitory computer-readable medium described herein may further include operations, features, means, or instructions for identifying that the UE lacks a valid timing advance value for the random access procedure, where the first message may be transmitted regardless of the UE lacking the valid timing advance value.

A method of wireless communication at a base station is described. The method may include transmitting, to a UE, an indication of a resource configuration for a random access procedure, the resource configuration identifying a set of sets of transmission resources corresponding to a set of radio resource control states, receiving, from the UE, a first message of the random access procedure, identifying a radio resource control state of the UE based on the received first message of the random access procedure and the transmitted indication of the resource configuration, and transmitting, to the UE based on the identified radio resource control state of the UE, a second message of the random access procedure in response to the received first message.

An apparatus for wireless communication at a base station is described. The apparatus may include a processor, memory in electronic communication with the processor, and instructions stored in the memory. The instructions may be executable by the processor to cause the apparatus to transmit, to a UE, an indication of a resource configuration for a random access procedure, the resource configuration identifying a set of sets of transmission resources corresponding to a set of radio resource control states, receive, from the UE, a first message of the random access procedure, identify a radio resource control state of the UE based on the received first message of the random access procedure and the transmitted indication of the resource configuration, and transmit, to the UE based on the identified radio resource control state of the UE, a second message of the random access procedure in response to the received first message.

Another apparatus for wireless communication at a base station is described. The apparatus may include means for transmitting, to a UE, an indication of a resource configuration for a random access procedure, the resource configuration identifying a set of sets of transmission resources corresponding to a set of radio resource control states, receiving, from the UE, a first message of the random access procedure, identifying a radio resource control state of the UE based on the received first message of the random access procedure and the transmitted indication of the resource configuration, and transmitting, to the UE based on the identified radio resource control state of the UE, a second message of the random access procedure in response to the received first message.

A non-transitory computer-readable medium storing code for wireless communication at a base station is described. The code may include instructions executable by a processor to transmit, to a UE, an indication of a resource configuration for a random access procedure, the resource configuration identifying a set of sets of transmission resources corresponding to a set of radio resource control states, receive, from the UE, a first message of the random access procedure, identify a radio resource control state of the UE based on the received first message of the random access procedure and the transmitted indication of the resource configuration, and transmit, to the UE based on the identified radio resource control state of the UE, a second message of the random access procedure in response to the received first message.

Some examples of the method, apparatuses, and non-transitory computer-readable medium described herein may further include operations, features, means, or instructions for identifying at least one transmission parameter used by the UE to transmit the first message, where the radio resource control state may be identified based on the identified at least one transmission parameter.

Some examples of the method, apparatuses, and non-transitory computer-readable medium described herein may further include operations, features, means, or instructions for determining a UE identifier based on the first message, and identifying a first set of transmission resources of the set of sets of transmission resources for the second message based on the UE identifier and the identified radio resource control state.

In some examples of the method, apparatuses, and non-transitory computer-readable medium described herein, identifying the radio resource control state may include operations, features, means, or instructions for identifying that the UE may be operating in one of a radio resource control inactive state, or a radio resource control connected state, or an radio resource control idle state.

In some examples of the method, apparatuses, and non-transitory computer-readable medium described herein, transmitting the indication of the resource configuration for the random access procedure may include operations, features, means, or instructions for transmitting system information, or radio resource control signaling, or a paging signal, or a combination thereof, including the indication of the resource configuration.

In some examples of the method, apparatuses, and non-transitory computer-readable medium described herein, the set of sets of transmission resources include time resources, or frequency resources, or spatial resources, or a combination thereof In some examples of the method, apparatuses, and non-transitory computer-readable medium described herein, the random access procedure may be a two-step random access procedure that includes the first message and the second message.

DETAILED DESCRIPTION

Figure 1:
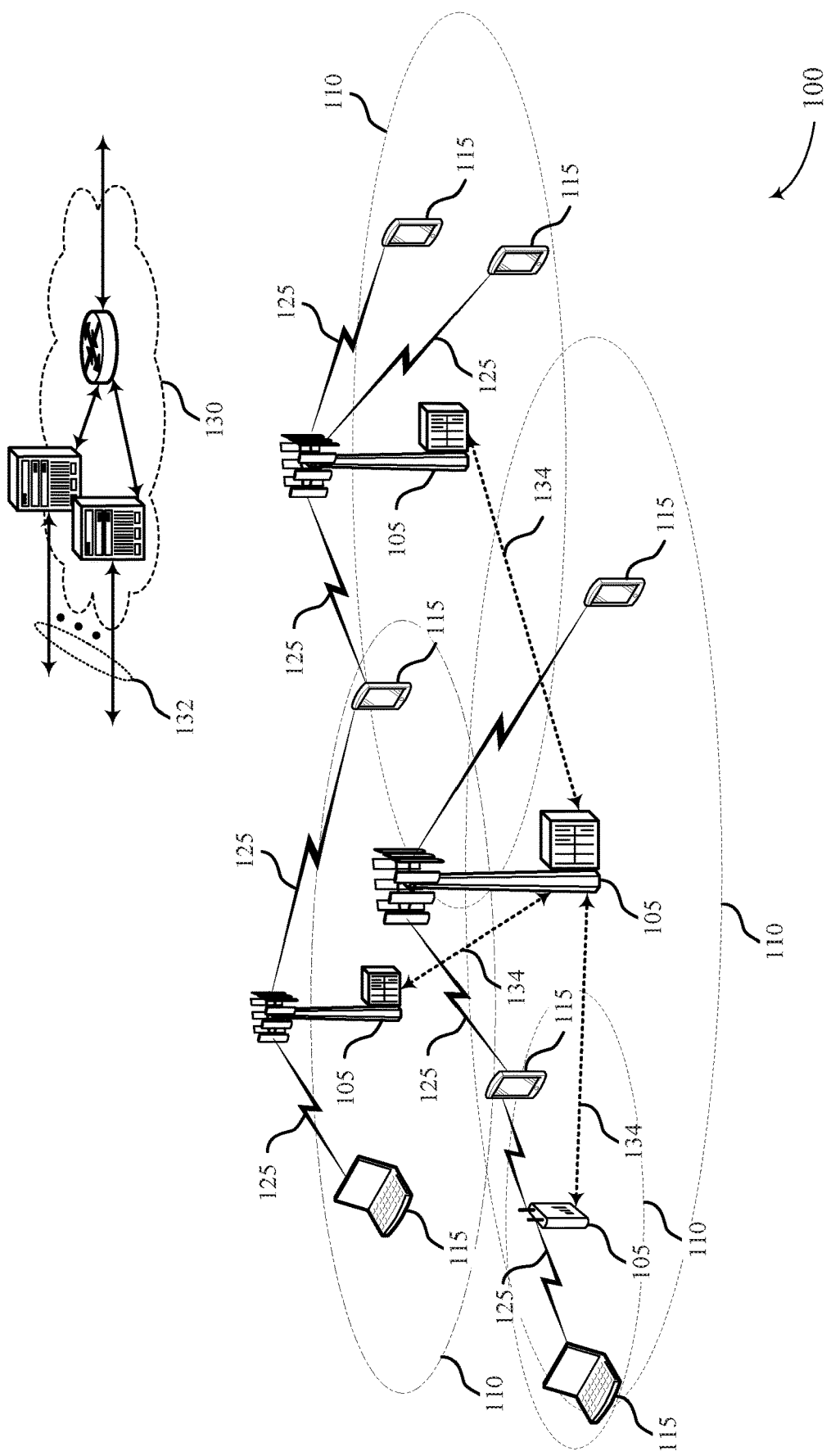
FIG. 1 illustrates an example of a wireless communications system that supports signaling support and resource mapping for two-step random access in accordance with aspects of the present disclosure.

A UE may perform a random access (RA) procedure with a base station involving a two-step handshake (e.g., as part of a two-step random access channel (RACH) procedure). For instance, the UE may transmit a first RA procedure message (e.g., a message A (msgA) transmission), which the base station may receive. The base station may transmit a second RA procedure message (e.g., a message B (msgB) transmission), which the UE may receive. In some cases, the second RA procedure message may be sent in response to the base station receiving msgA. The first RA procedure message may include a preamble and an uplink channel (e.g., a physical uplink shared channel (PUSCH)) and the second RA procedure message may include a downlink control channel (e.g., a physical downlink control channel (PDCCH)) and a downlink data channel (e.g., a physical downlink shared channel (PDSCH)).

The preamble of the first RA procedure message (e.g., a physical random access control channel (PRACH) preamble) may be a long sequence preamble or a short sequence preamble. Long sequence preambles may, for instance, have a longer preamble length and/or cyclic prefix (CP) length than short sequence preambles. In either case, each preamble may be associated with a particular set of bandwidths. For instance, long sequence preambles may be associated with bandwidths of 1.08 megahertz (MHz) or 4.32 MHz, where numerology may be different from PUSCHs. Short sequence preambles may be associated with 2.16 MHz or 4.32 MHz and may have the same numerology as PUSCHs. Additionally or alternatively, short sequence preambles may have 12 physical resource blocks (e.g., 12 PRBs) and may have a subcarrier spacing (SCS) of 15 kHz or 30 kHz (e.g., within FR1).

In some cases, the bandwidth of the preamble in a first RA procedure message may be insufficient to be used as a bandwidth of a corresponding PUSCH (e.g., the PUSCH in the RA procedure message) and/or demodulation reference signal (DMRS). For instance, a payload size of the PUSCH may be so large that a single PUSCH transmission with the same or smaller bandwidth as the preamble may span an amount of time greater than an acceptable threshold. Similarly, the bandwidth of a downlink control channel (e.g., PDCCH) may be insufficient to be used as a bandwidth of downlink data channel transmissions (e.g., PDSCHs).

In such cases or in other cases, msgA may contain a preamble portion and a payload portion and may be configured with a different number of physical resources. The entire pool of preambles may be partitioned into different subsets, and each subset of preambles may be associated with a specific RRC state and/or pre-configured payload size whose PUSCH and/or DMRS are mapped to one or more sets of physical resources. For instance, a first subset of the preamble may be mapped to a first payload resource, a second subset of a preamble may be mapped to a second payload resource, and a third subset of a preamble may be mapped to a third payload resource, and so on. The set of resources to which the subsets of the preamble are mapped may be preconfigured and may be chosen based on RRC state (e.g., whether the UE is operating in an inactive state such as RRC_INACTIVE, or a connect state such as RRC_CONNECTED, or an idle state such as RRC_IDLE state). In one example, each mapped resource for a payload of a msgA may be overlap in time but may be transmitted on different subchannels or sub-bands. In such cases, the preamble may be transmitted before the payload or may overlap in time with the payload but may be disjoint from the mapped resources in frequency. In another example, each mapped resource for a payload of msgA may overlap in frequency but may be disjoint from each other in time. In another example, each mapped resource of a payload of msgA may overlap in frequency and/or time, but may be disjoint in space (e.g., each mapped resource may be sent over a separate beam). Each mapped resource for a payload of msgA may be configured for the same or different RRC states and may have the same or different transport block sizes (TBSs) and/or modulation coding schemes (MCSs) as other mapped resources.

In some cases, UEs may be distinguished based on different multiple access (MA) signatures and/or different UE identifiers (IDs) (e.g., RA radio network temporary ID (RA-RNTI)). MA signatures may be carried by the preamble, the DMRSs of the mapped resources, a resource index, or a combination in time, frequency and/or space. A base station may determine RA-RNTIs for msgB based on RRC state and/or an index of a MA signature of the first RA procedure message, and may scramble the RA-RNTI with downlink control information (DCI) of the downlink control channel of the second RA procedure message.

Aspects of the disclosure are initially described in the context of a wireless communications system. Aspects of the disclosure are additionally described in the context of an additional wireless communications system, a transmission chain, resource mapping schemes, and a process flow. Aspects of the disclosure are further illustrated by and described with reference to apparatus diagrams, system diagrams, and flowcharts that relate to signaling support and resource mapping for two-step random access.

FIG. 1 illustrates an example of a wireless communications system 100 that supports signaling support and resource mapping for two-step random access in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

Two-step random access may involve msgA transmission from a UE 115 to a base station 105 and msgB transmission from the base station 105 to the UE 115. The channel structure of msgA may include a preamble and a PUSCH and the channel structure of msgB may include a PDCCH and a PDSCH. According to the methods disclosed herein, two-step random access may be able to operate regardless of whether the UE 115 has a valid timing advance (TA) or not. Additionally or alternatively, two-step random access as described herein may be applicable to any of a range of cell sizes. Additionally or alternatively, two-step random access as described herein may be applied for any of a range of RRC states, including inactive, connected, or idle states (e.g., RRC_INACTIVE, RRC_CONNECTED, or RRC_IDLE). It should be noted that the methods described herein may be applied in one or more of multiple communication scenarios (e.g., massive machine type communication (mMTC), ultra-reliable low latency communications (URLLC), or enhanced mobile broadband (eMBB)), and may be compatible with communication in licensed and/or unlicensed spectrum. For a UE 115 (e.g., a downlink-synchronized UE 115), two-step random access may achieve better performance, lower latency, and/or lower complexity than 4-step RACH and CP extension.

In general, PUSCH transmissions in msgA may be based on a non-orthogonal multiple access (NOMA) low code rate spreading (LCRS) scheme. Additionally or alternatively, PUSCH reception in msgA may use a NOMA advanced receiver. A NOMA advanced receiver may, for instance, be able to receive transmissions from multiple UEs 115 simultaneously. In general, preamble and/or DMRS sequence may be down-selected from NR PRACH preamble and DMRS sequences, respectively. Data in PUSCH may be transmitted without a TA and may facilitate savings in latency and transmit power. In some cases, msgA transmission may be grant-free (e.g., may be transmitted without first receiving a grant of resources) and/or contention-based (e.g., may involve determining if other UEs 115 or base stations 105 are transmitting on same time and/or frequency resources). After transmitting msgA, a UE 115 may monitor the DCI of msgB within a pre-configured search space and RA response (RAR) window. In general, msgB may carry a PDCCH, which may contain a DCI, and a PDSCH, which may contain a RAR. DCI may specify the frequency domain resource allocation of RAR.

Wireless communications system 100 may support efficient techniques for signaling support and resource mapping for two-step random access. For instance, a UE 115 may receive, from a base station 105, an indication of a resource configuration for a RA procedure, the resource configuration identifying multiple sets of transmission resources corresponding to a set of RRC states. The UE 115 may identify a RRC state of the UE 115. The UE 115 may determine a set of transmission resources based on the indication of the resource configuration and the identified RRC state. The UE 115 may transmit a first message of the RA procedure (e.g., msgA) to the base station 105 using the determined resources. The base station may identify a RRC state of the UE 115 based on the received first message of the RA procedure and the transmitted indication of the resource configuration. The base station 105 may transmit, to the UE 115 based on the identified RRC state of the UE 115, a second message of the random access procedure (e.g., msgB) in response to the received first message.

Figure 2:
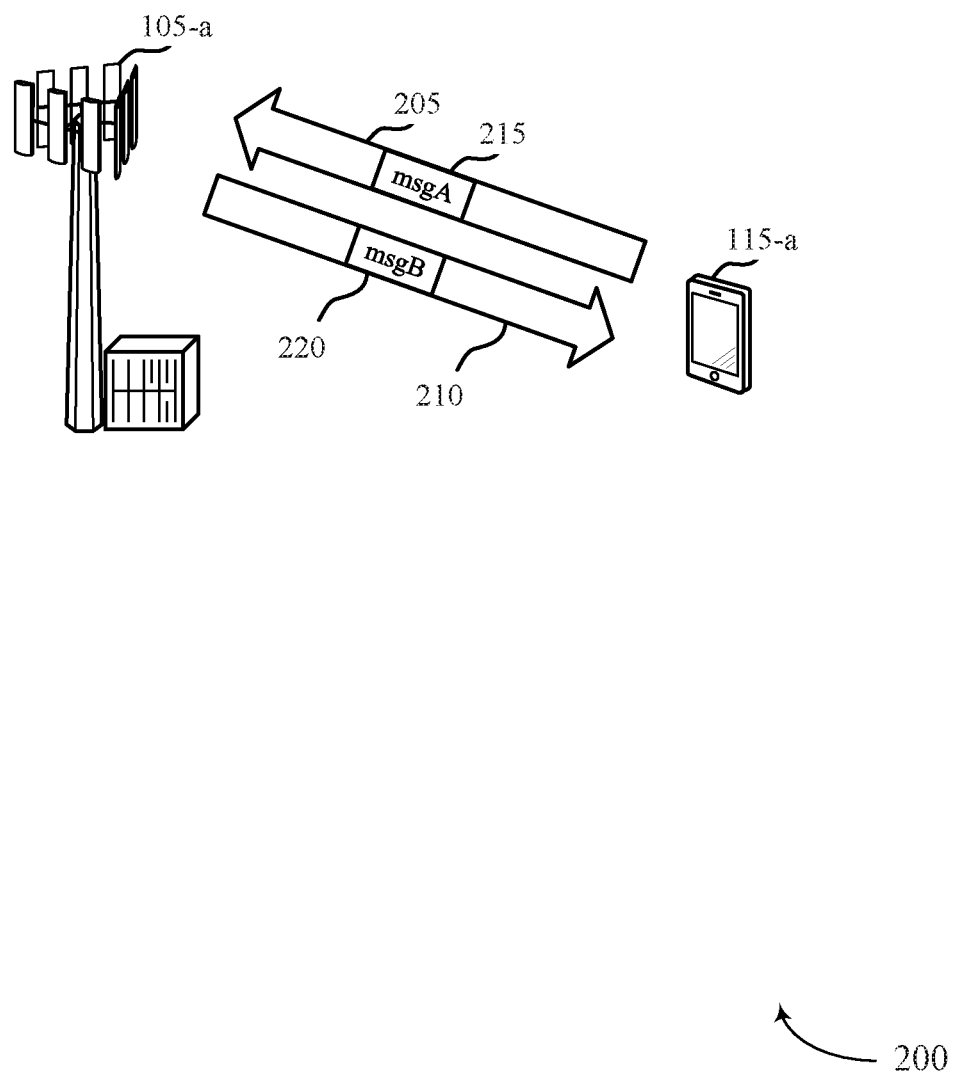
FIG. 2 illustrates an example of a wireless communications system that supports signaling support and resource mapping for two-step random access in accordance with aspects of the present disclosure.

FIG. 2 illustrates an example of a wireless communications system 200 that supports signaling support and resource mapping for two-step random access in accordance with aspects of the present disclosure. In some examples, wireless communications system 200 may implement aspects of wireless communications system 100. For instance, wireless communications system may include UE 115-a and base station 105-a, which may be examples of a UE 115 and a base station 105 as described with reference to FIG. 1.

A base station 105-a and a UE 115-a may communicate with each other through downlink communication link 205 and uplink communication link 210. In one example, base station 105-a and UE 115-a may perform a two-step RA procedure. For instance, UE 115-a may transmit a msgA 215, which base station 105-a may receive, over downlink communication link 205. The msgA 215 may include a preamble (e.g., a RACH preamble) and/or a uplink channel (e.g., a PUSCH). Additionally or alternatively, base station 105-a may transmit a msgB 220, which may be received by UE 115-a, over uplink communication link 210. The msgB 220 may include a downlink control channel (e.g., a PDCCH) and a downlink data channel (e.g., a PDSCH). The PDCCH may include a DCI, and the PDSCH may include a RAR window. In some cases, base station 105-a may send msgB 220 in response to receiving msgA 215.

Within msgA 215 transmissions, different UEs 115 may be distinguished by their MA signatures. MA signatures may be carried at least by a combination of preamble (e.g., PRACH preamble), DMRS, and/or resource index for msgA 215 in time, frequency, and/or space (e.g., beams). The configuration may be signaled by a system information block (SIB), RRC signals, and/or paging signals, and may be respected by UE 115-a and/or base station 105-a.

Within msgB 220 transmissions, different UEs 115 may be distinguished by their UE IDs. For instance, the UE ID associated with the msgB transmission may be an RA-RNTI for two-step random access that has a UE 115 or MA signature index which has successfully been decoded and may be based on an RRC state detected by base station 105-a. Payload bits of DCI associated with msgB 220 may be scrambled with RA-RNTI. The scrambling code generation may be based on preconfigured polynomials or other functions (e.g., mathematical functions). The configuration of search space and/or RAR window within msgB 220 may be chosen as a function of RRC state. Such configurations may be signaled by SIB, RRC, and/or paging signals, and may be respected by UE 115-a and/or base station 105-a.

Figure 3:
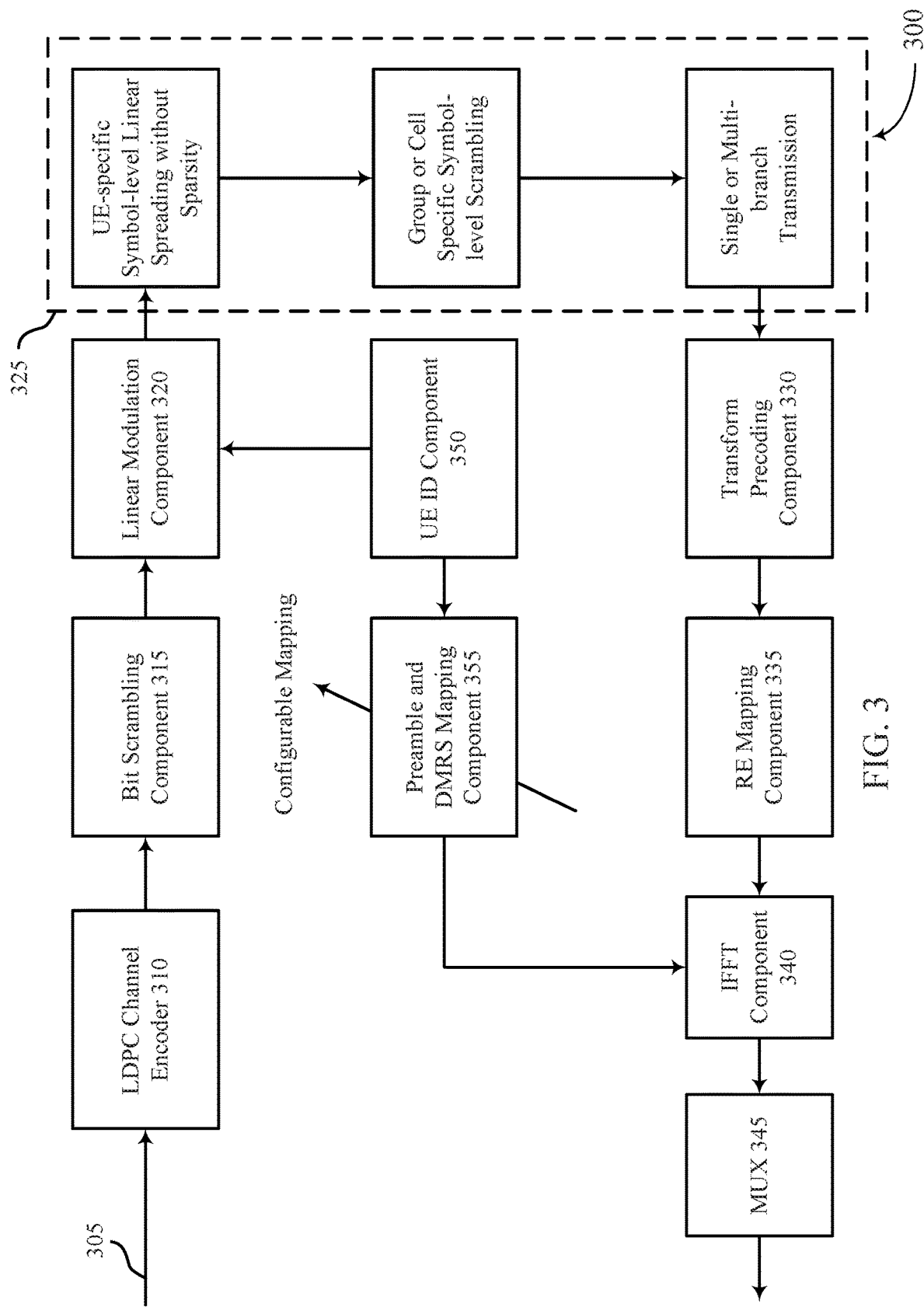
FIG. 3 illustrates an example of a transmission chain that supports signaling support and resource mapping for two-step random access in accordance with aspects of the present disclosure.

FIG. 3 illustrates an example of a transmission chain 300 that supports signaling support and resource mapping for two-step random access in accordance with aspects of the present disclosure. In some examples, transmission chain 300 may implement aspects of wireless communications systems 100 and 200. For instance, transmission chain 300 may be implemented by a base station 105 and/or a UE 115 as described with reference to FIGS. 1 and 2.

Transmission chain 300 may demonstrate how information of a msgA is prepared for transmission. Information bits 305 may, for instance, be encoded by a low-density parity-check (LDPC) encoder 310 and may undergo bit scrambling (by bit scrambling component 315). Bit scrambling may depend on the UE ID (e.g., the RA-RNTI) and/or MA signature of a UE 115 to transmit the msgA (e.g., output by UE ID component 350), which may, in turn, depend on the RRC state (e.g., an inactive state, a connected state, an idle state) of the associated UE 115. The bit scrambled information may undergo linear modulation (e.g., via linear modulation component 320) and, in some cases (e.g., if the information is associated with a spreading factor (SF) that is not equal to 1), the information may undergo UE-specific symbol-level linear spreading without sparsity, group or cell-specific symbol-level scrambling, and/or single or multi-branch transmission (e.g., via spreading factor component 325). Regardless of whether spreading is performed, the information may undergo transform precoding (e.g., via transform precoding component 330) and/or resource element (RE) mapping (e.g., via RE mapping component 335), and may be transformed through an inverse fast Fourier transform (IFFT) (e.g., via a IFFT component 340). The transformed information may be passed through a multiplexer (MUX) 345.

In some cases, the output of the MUX 345 may be affected by preamble and DMRS mapping (e.g., via preamble and DMRS mapping component 355). As described herein, a msgA preamble and/or DMRS (e.g., a DMRS associated with a PUSCH of msgA) may be mapped to a number of configurations in time, frequency, and/or space (e.g., beams). This configuration may affect the resources the information output from transmission chain 300 are transmitted on. The preamble and DMRS mapping may be configurable and may depend on UE ID (e.g., RA-RNTI) and/or MA signature (e.g., via UE ID component 350). For instance, a first configuration may be used if the UE 115 is associated with a first UE ID and a second configuration may be used if the UE 115 is associated with a second UE ID.

Figure 4A:
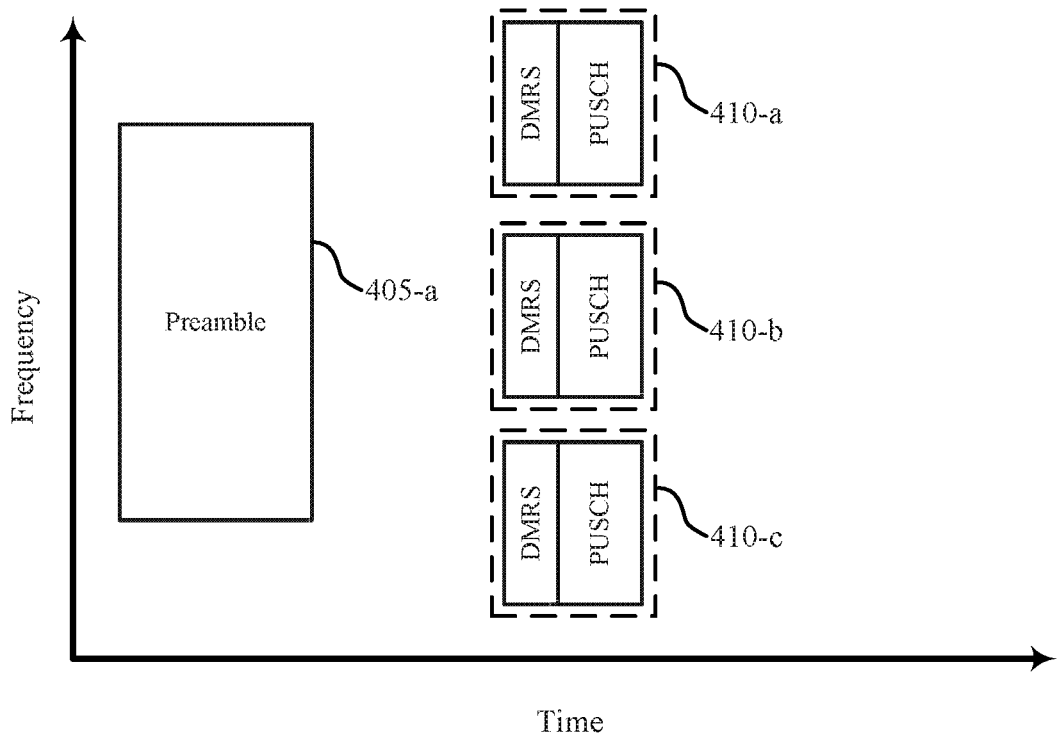
FIGS. 4A, 4B, and 4C illustrate examples of resource mapping schemes that support signaling support and resource mapping for two-step random access in accordance with aspects of the present disclosure.

FIG. 4A illustrates an example of a resource mapping scheme 400 that supports signaling support and resource mapping for two-step random access in accordance with aspects of the present disclosure. In some examples, resource mapping scheme 400 may implement aspects of wireless communications systems 100 and 200. For instance, resource mapping scheme 400 may be implemented by a UE 115 and/or a base station 105 as described with reference to FIGS. 1 and 2.

Resource mapping scheme 400 may include a preamble 405-a and one or more mapped resources 410-a for a payload of msgA. Preamble 405-a may represent a preamble of a msgA and mapped resources 410 may represent resources for a payload of a msgA that are associated with subsets of preamble 405-a. For instance, mapped resource 410-a may be associated with a first subset of preamble 405-a (e.g., subset A), mapped resource 410-b may be associated with a second subset of preamble 405-a (e.g., subset B), and mapped resources 410-c may be associated with a third subset of preamble 405-a (e.g., subset C). Each mapped resource 410 may include a DMRS and a PUSCH. It should be noted that the present example may also apply to msgB transmissions. For instance, instead of a preamble 405-a, a PDCCH and/or a DCI of the PDCCH may be transmitted. Additionally, instead of a PUSCH being transmitted on mapped resources 410, a PDSCH may be transmitted on mapped resources 410. Resource mapping scheme 400 may be chosen based on a RRC state of a UE 115 (resource mapping scheme 400 may be chosen if a UE 115 is in an idle state and resource mapping scheme 401 may be used if the UE 115 is in a connected state) associated with msgA (or msgB, if referring to PDCCH and/or PDSCH). Subsets A, B, and C may be made mutually exclusive and/or partially overlapping.

Preamble 405-a may be disjoint in time from mapped resources 410 for a msgA payload (e.g., before mapped resources 410-a, 410-b, and 410-c), but may overlap in frequency with at least some of mapped resources 410 for msgA payload (e.g., preamble 405-a may overlap with mapped resources 410-a, 410-b, and 410-c, but there may be other mapped resources 410 that preamble 405-a does not overlap). Mapped resources 410 for a msgA payload may overlap at least partially in time, but may be disjoint in frequency. For instance mapped resource 410-a may span a first frequency range, mapped resource 410-b may span a second frequency range disjoint from the first, and mapped resource 410-c may span a third frequency range disjoint from the first and second. It should be noted that extension to space domain may also be used by considering beam sweeping and/or beam forming. Different TBSs and/or MCSs associated with the same or different RRC states may be mapped to different mapped resources 410. In some cases, a first set of the mapped resources 410 (e.g., mapped resources 410-a and 410-b) may be used if UE 115-a is associated with a first RRC state (e.g., an idle state), a first TBS, and/or a first MCS, and a second set of the mapped resources 410 (e.g., mapped resource 410-c) may be used if UE 115-a is associated with a second RRC state (e.g., an inactive state) a second TBS, and/or a second MCS. Each set may share common mapped resources 410 with other sets or may have mapped resources 410 distinct from other sets. Alternatively, the same mapped resources 410 may be transmitted on for all RRC states.

A base station 105 and a UE 115 may use resource mapping scheme 400 in situations where the base station 105 and the UE 115 are communicating in licensed spectrum. Additionally or alternatively, a base station 105 and a UE 115 may use resource mapping scheme 400 in situations where time and/or channel availability is constrained (e.g., preamble 405-a and mapped resources 410 are to be transmitted within a certain duration of time).

Figure 4B:
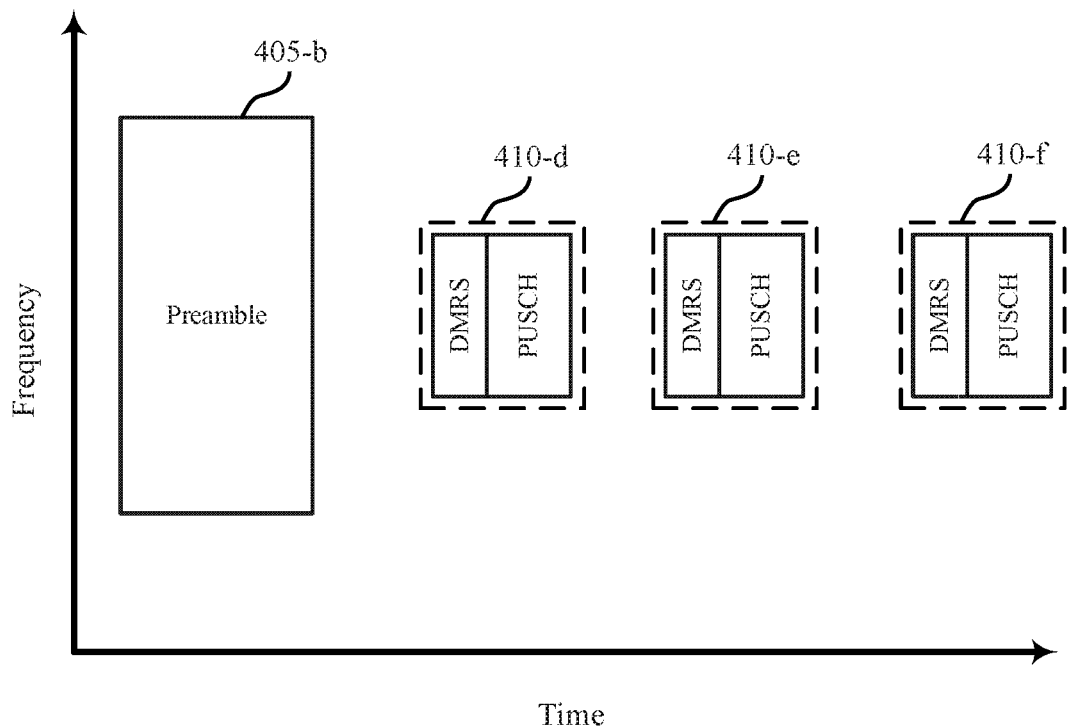

FIG. 4B illustrates an example of a resource mapping scheme 401 that supports signaling support and resource mapping for two-step random access in accordance with aspects of the present disclosure. In some examples, resource mapping scheme 401 may implement aspects of wireless communications system 100. For instance, resource mapping scheme 401 may be implemented by a UE 115 and/or a base station 105 as described with reference to FIGS. 1 and 2.

Resource mapping scheme 401 may include a preamble 405-b and one or more mapped resources 410 for a payload of msgA. Preamble 405-b may represent a preamble of a msgA and mapped resources 410 may represent resources of a payload of msgA that are associated with subsets of preamble 405-b. For instance, mapped resource 410-d may be associated with a first subset of preamble 405-b (e.g., subset A), mapped resource 410-e may be associated with a second subset of preamble 405-b (e.g., subset B), and mapped resources 410-f may be associated with a third subset of preamble 405-b (e.g., subset C). Each mapped resource 410 may include a DMRS and a PUSCH. It should be noted that the present example may also apply to msgB transmissions. For instance, instead of a preamble 405-b, a PDCCH and/or a DCI of the PDCCH may be transmitted. Additionally, instead of a PUSCH being transmitted on mapped resources 410, a PDSCH may be transmitted on mapped resources 410. Resource mapping scheme 400 may be chosen based on a RRC state of a UE 115 (resource mapping scheme 400 may be chosen if a UE 115 is in an idle state and resource mapping scheme 401 may be used if the UE 115 is in a connected state) associated with msgA (or msgB, if referring to PDCCH and/or PDSCH). Subsets A, B, and C may be made mutually exclusive and/or partially overlapping.

Preamble 405-b may be disjoint in time from mapped resources 410 for a msgA payload (e.g., before mapped resources 410-d, 410-e, and 410-f), but may overlap in frequency with at least some of mapped resources 410 for a msgA payload (e.g., preamble 405-b may overlap with mapped resources 410-d, 410-e, and 410-f, but there may be other mapped resources 410 that preamble 405-b does not overlap). Mapped resources 410 may overlap at least partially in frequency, but may be disjoint in time. For instance mapped resource 410-d may span a first time duration, mapped resource 410-e may span a second time duration disjoint from the first, and mapped resource 410-f may span a third time duration disjoint from the first and second. It should be noted that extension to space domain may also be used by considering beam sweeping and/or beam forming. Different TBSs and/or MCSs associated with the same or different RRC states may be mapped to different mapped resources 410. In some cases, a first set of the mapped resources 410 (e.g., mapped resources 410-d and 410-e) may be used if a UE 115 is associated with a first RRC state (e.g., an idle state), a first TBS, and/or a first MCS and a second set of the mapped resources 410 (e.g., mapped resource 410-f) may be used if UE 115 is associated with a second RRC state (e.g., an inactive state), a second TBS, and/or a second MCS. Each set may share common mapped resources 410 with other sets or may have mapped resources 410 distinct from other sets. Alternatively, the same mapped resources 410 may be transmitted on for all RRC states.

A base station 105 and a UE 115 may use resource mapping scheme 401 in situations where the base station 105 and the UE 115 are communicating in licensed spectrum. Additionally or alternatively, a base station 105 and a UE 115 may use resource mapping scheme 401 in situations where frequency range is constrained (e.g., preamble 405-*b* and mapped resources 410 are to be within a certain range of frequencies).

Figure 4C:
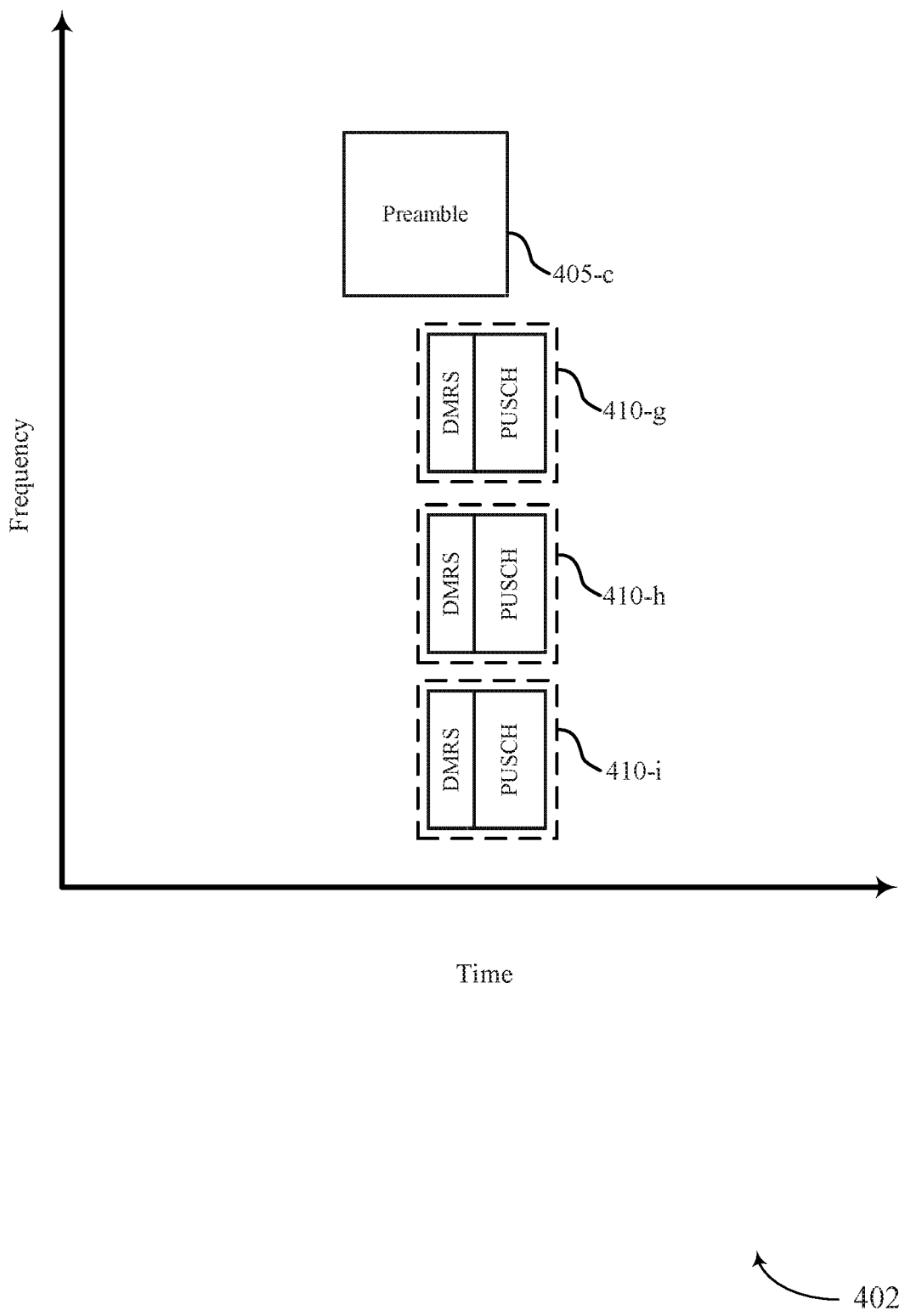

FIG. 4C illustrates an example of a resource mapping scheme 402 that supports signaling support and resource mapping for two-step random access in accordance with aspects of the present disclosure. In some examples, resource mapping scheme 402 may implement aspects of wireless communications system 100. For instance, resource mapping scheme 402 may be implemented by a UE 115 and/or a base station 105 as described with reference to FIGS. 1 and 2.

Resource mapping scheme 402 may include a preamble 405-*c* and one or more mapped resources 410 for a payload of msgA. Preamble 405-*c* may represent a preamble of a msgA and mapped resources 410 may represent resources for a payload of msgA that are associated with subsets of preamble 405-*c*. For instance, mapped resource 410-*g* may be associated with a first subset of preamble 405-*c* (e.g., subset A), mapped resource 410-*h* may be associated with a second subset of preamble 405-*c* (e.g., subset B), and mapped resources 410-*i* may be associated with a third subset of preamble 405-*c* (e.g., subset C). Each mapped resource 410 may include a DMRS and a PUSCH. It should be noted that the present example may also apply to msgB transmissions. For instance, instead of a preamble 405-*c*, a PDCCH and/or a DCI of the PDCCH may be transmitted. Additionally, instead of a PUSCH being transmitted on mapped resources 410, a PDSCH may be transmitted on mapped resources 410. Resource mapping scheme 400 may be chosen based on a RRC state of a UE 115 (resource mapping scheme 402 may be chosen if a UE 115 is in an idle state and resource mapping scheme 401 may be used if the UE 115 is in a connected state) associated with msgA (or msgB, if referring to PDCCH and/or PDSCH). Subsets A, B, and C may be made mutually exclusive and/or partially overlapping.

Preamble 405-*c* may be disjoint in frequency from mapped resources 410 for a msgA payload (e.g., spanning a frequency range above or below mapped resources 410-*g*, 410-*h*, and 410-*i*), but may overlap in time with at least some of mapped resources 410 for a msgA payload (e.g., preamble 405-*a* may overlap in time with mapped resources 410-*g*, 410-*h*, and 410-*i*, but there may be other mapped resources 410 that preamble 405-*c* does not overlap in time with). Mapped resources 410 may overlap at least partially in time, but may be disjoint in frequency. For instance mapped resource 410-*g* l may span a first frequency range, mapped resource 410-*h* may span a second frequency range disjoint from the first, and mapped resource 410-*i* may span a third frequency range disjoint from the first and second. It should be noted that extension to space domain may also be used by considering beam sweeping and/or beam forming. Different TBSs and/or MCSs associated with the same or different RRC states may be mapped to different mapped resources 410. In some cases, a first set of the mapped resources 410 (e.g., mapped resources 410-*g* and 410-*h*) may be used if UE 115-*a* is associated with a first RRC state (e.g., an idle state), first TBS, and/or first MCS and a second set of the mapped resources 410 (e.g., mapped resource 410-*i*) may be used if UE 115-*a* is associated with a second RRC state (e.g., an inactive state), a second TBS, and/or a second MCS. Each set may share common mapped resources 410 with other sets or may have mapped resources 410 distinct from other sets. Alternatively, the same mapped resources 410 may be transmitted on for all RRC states.

A base station 105 and a UE 115 may use resource mapping scheme 402 in situations where the base station 105 and the UE 115 are communicating in unlicensed spectrum. Additionally or alternatively, a base station 105 and a UE 115 may use resource mapping scheme 402 in situations where time and/or channel availability is constrained (e.g., preamble 405-*c* and mapped resources 410 are to be transmitted within a certain duration of time).

Figure 5:
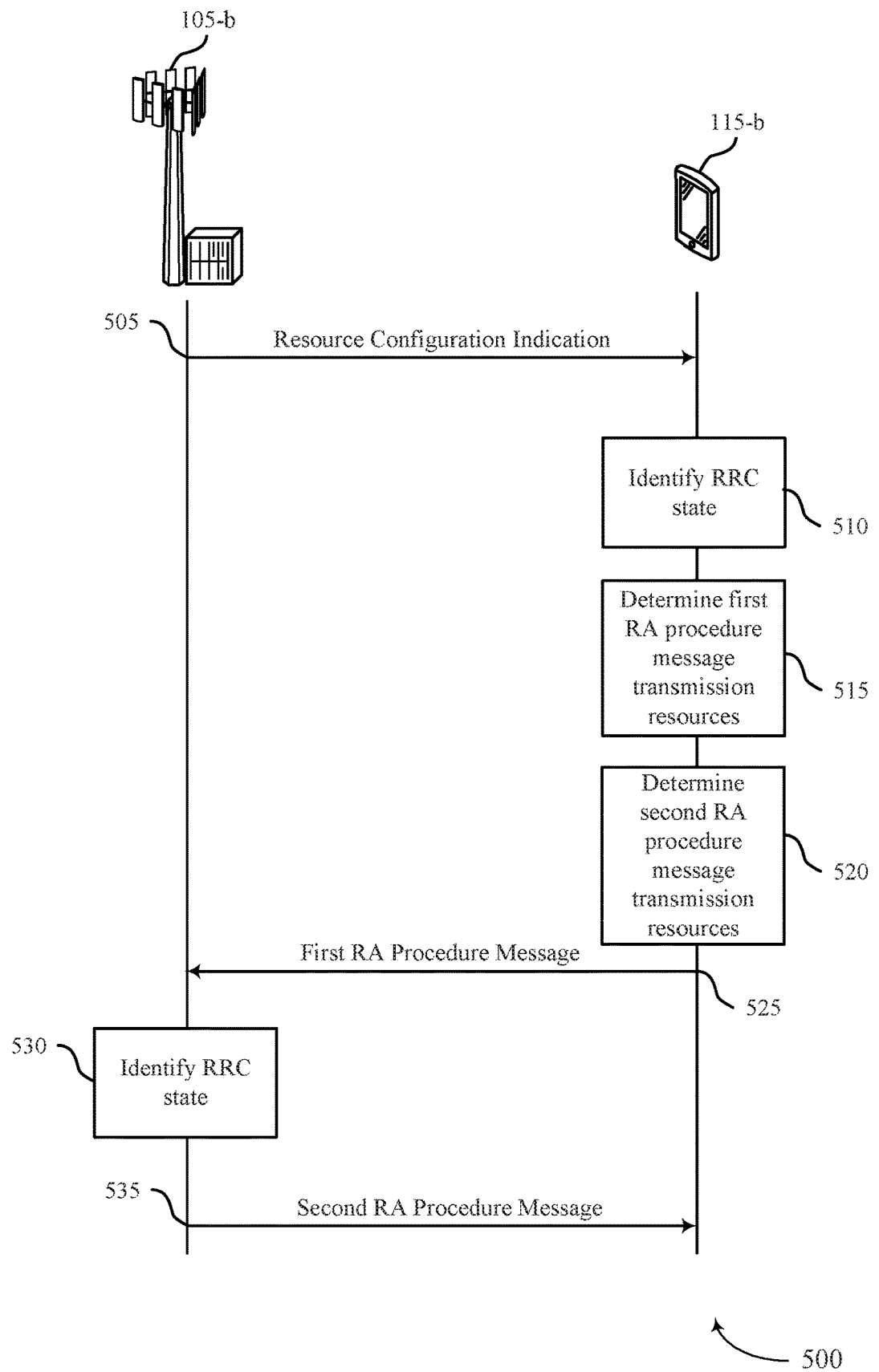
FIG. 5 illustrates an example of a process flow that supports signaling support and resource mapping for two-step random access in accordance with aspects of the present disclosure.

FIG. 5 illustrates an example of a process flow 500 that supports signaling support and resource mapping for two-step random access in accordance with aspects of the present disclosure. In some examples, process flow 500 may implement aspects of wireless communications systems 100 and 200. For instance, process flow 500 may include UE 115-*b* and base station 105-*b*, which may be examples of a UE 115 and a base station 105 as described with reference to FIGS. 1 and 2.

At 505, base station 105-*b* may transmit an indication of a resource configuration for a RA procedure (e.g., via a SIB, RRC signaling, or page signaling). The resource configuration may identify multiple sets of transmission resources corresponding to multiple RRC states (e.g., one set of transmission resources may be used if UE 115-*b* is in an idle state, another if UE 115-*b* is in a connected state). UE 115-*b* may receive the indication.

At 510, UE 115-*b* may identify an RRC state. For instance, UE 115-*b* may identify if it is operating in a connected, idle, or inactive state (e.g., in RRC_CONNECTED, RRC_IDLE, or RRC_INACTIVE).

At 515, UE 115-*b* may determine a set of transmission resources based on the indication of the resource configuration and the identified RRC state. The set of resources may be determined for a first message of the RA procedure. In one example, if UE 115-*b* is in an idle state, UE 115-*b* may choose a set of transmission resources from the indication corresponding to the idle state. In some cases, the set of transmission resources may be determined based on identifying one or more transmission parameters (e.g., TBS and/or MCS) to be used by UE 115-*b* or a UE ID (e.g., a MA signature and/or a RA-RNTI) identified based on a RRC state of UE 115-*b*.

At 520, UE 115-*b* may determine a set of resources for reception of the second RA procedure message (e.g., msgB).

At 525, UE 115-*b* may transmit a first message of the RA procedure using the determined transmission resources. Base station 105-*b* may receive the first message over the determined transmission resources.

At 530, base station 105-*b* may identify an RRC state of UE 115-*b* based on the received first message and/or the transmitted indication of the resource configuration.

At 535, base station 105-*b* may transmit a second message of the RA procedure. The second message may be sent in response to the received first message and may be received by UE 115-*b*. In some cases, UE 115-*b* may monitor for the second message based on a UE ID (e.g., a MA signature and/or a RA-RNTI) identified based on a RRC state of UE 115-*b*. Additionally or alternatively, UE 115-*b* may monitor for the second message based on determining a search space for a control region and/or time duration (e.g., a RAR window) of the second message, where the search space and/or time duration may be determined based on the identified RRC state of UE 115-*b*.

Figure 6:
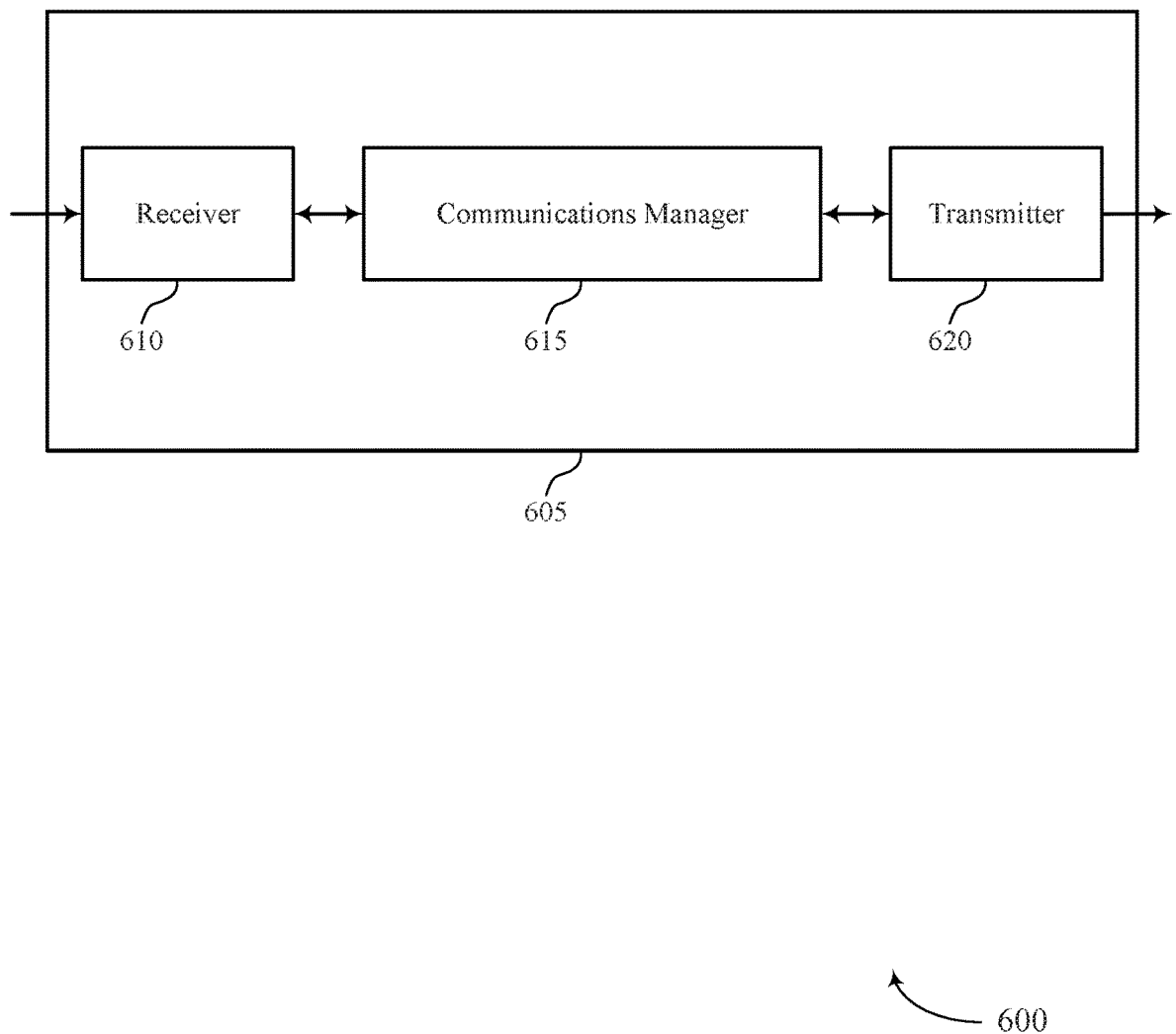
FIGS. 6 and 7 show block diagrams of devices that support signaling support and resource mapping for two-step random access in accordance with aspects of the present disclosure.

FIG. 6 shows a block diagram 600 of a device 605 that supports signaling support and resource mapping for two-step random access in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to signaling support and resource mapping for two-step random access, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may receive, from a base station, an indication of a resource configuration for a random access procedure, the resource configuration identifying a set of sets of transmission resources corresponding to a set of radio resource control states, identify a radio resource control state of the UE, determine a set of transmission resources based on the indication of the resource configuration, a transport format, and the identified radio resource control state, and transmit a first message of the random access procedure to the base station using the determined transmission resources. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
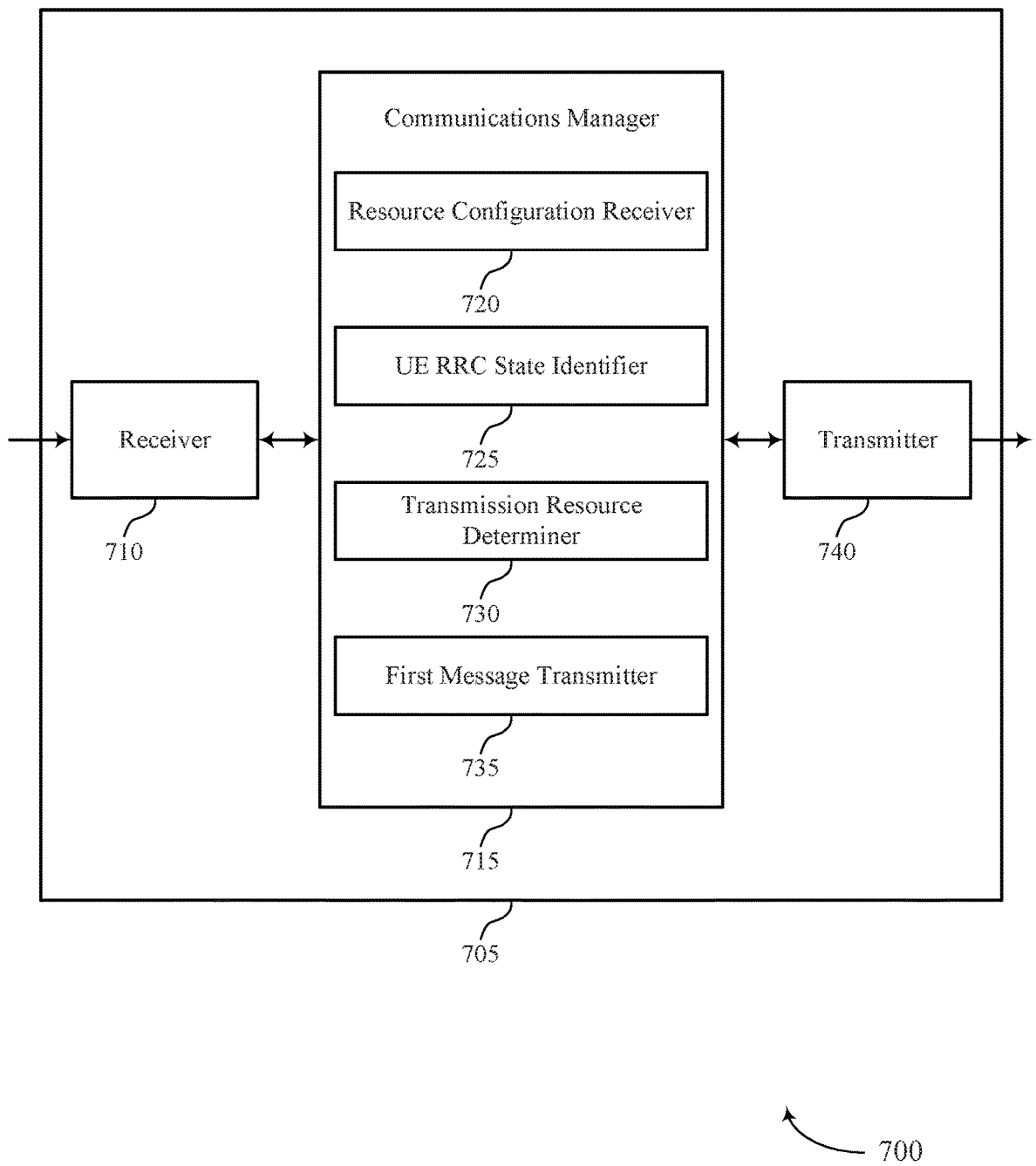

FIG. 7 shows a block diagram 700 of a device 705 that supports signaling support and resource mapping for two-step random access in accordance with aspects of the present disclosure. The device 705 may be an example of aspects of a device 605, or a UE 115 as described herein. The device 705 may include a receiver 710, a communications manager 715, and a transmitter 740. The device 705 may also include a processor. Each of these components may be in communication with one another (e.g., via one or more buses).

The receiver 710 may receive information such as packets, user data, or control information associated with various information channels (e.g., control channels, data channels, and information related to signaling support and resource mapping for two-step random access, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a resource configuration receiver 720, an UE RRC state identifier 725, a transmission resource determiner 730, and a first message transmitter 735. The communications manager 715 may be an example of aspects of the communications manager 910 described herein.

The resource configuration receiver 720 may receive, from a base station, an indication of a resource configuration for a random access procedure, the resource configuration identifying a set of sets of transmission resources corresponding to a set of radio resource control states.

The UE RRC state identifier 725 may identify a radio resource control state of the UE.

The transmission resource determiner 730 may determine a set of transmission resources based on the indication of the resource configuration, a transport format, and the identified radio resource control state.

The first message transmitter 735 may transmit a first message of the random access procedure to the base station using the determined transmission resources.

The transmitter 740 may transmit signals generated by other components of the device 705. In some examples, the transmitter 740 may be collocated with a receiver 710 in a transceiver module. For example, the transmitter 740 may be an example of aspects of the transceiver 920 described with reference to FIG. 9. The transmitter 740 may utilize a single antenna or a set of antennas.

Figure 8:
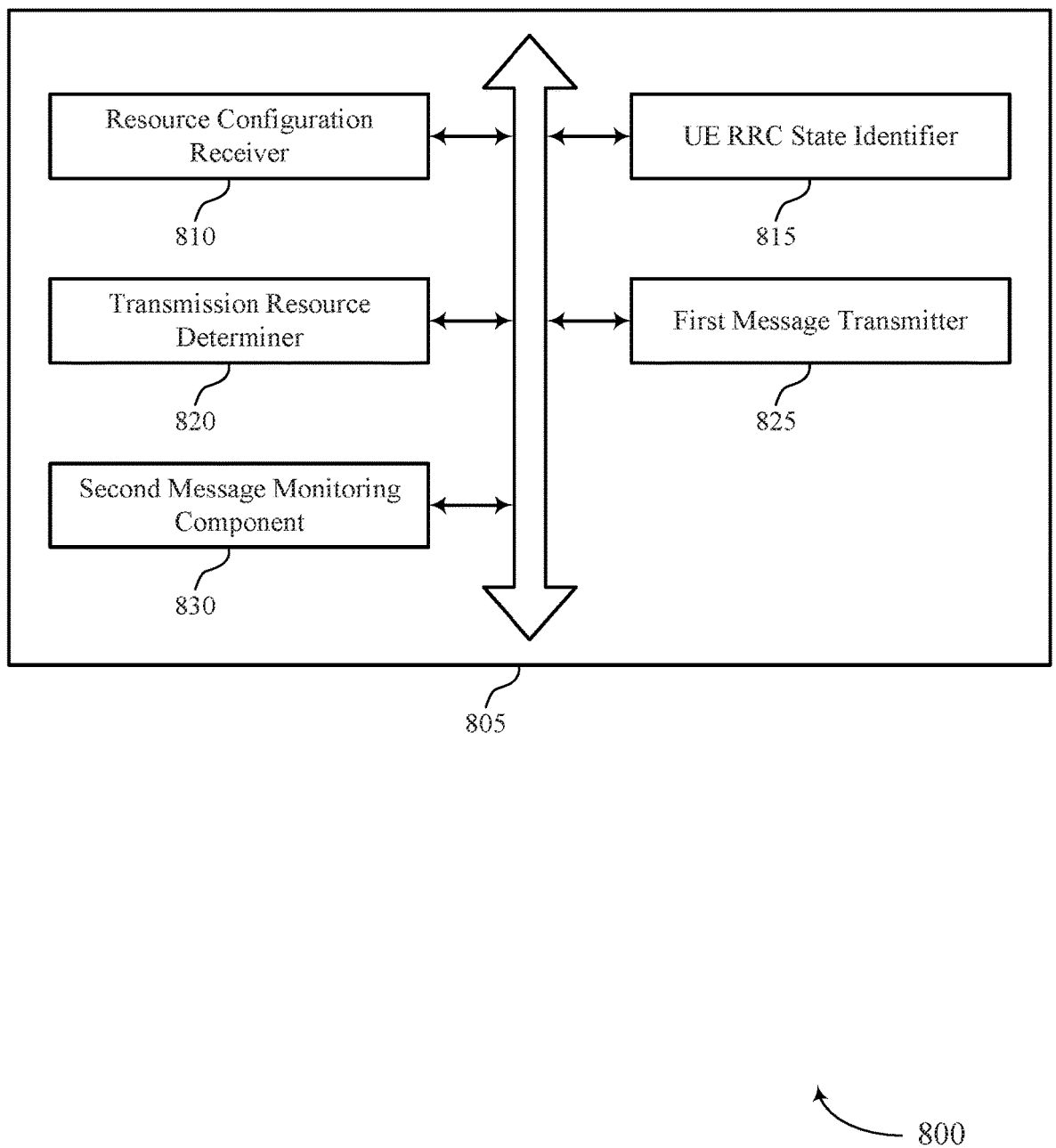
FIG. 8 shows a block diagram of a communications manager that supports signaling support and resource mapping for two-step random access in accordance with aspects of the present disclosure.

FIG. 8 shows a block diagram 800 of a communications manager 805 that supports signaling support and resource mapping for two-step random access in accordance with aspects of the present disclosure. The communications manager 805 may be an example of aspects of a communications manager 615, a communications manager 715, or a communications manager 910 described herein. The communications manager 805 may include a resource configuration receiver 810, an UE RRC state identifier 815, a transmission resource determiner 820, a first message transmitter 825, and a second message monitoring component 830. Each of these modules may communicate, directly or indirectly, with one another (e.g., via one or more buses).

The resource configuration receiver 810 may receive, from a base station, an indication of a resource configuration for a random access procedure, the resource configuration identifying a set of sets of transmission resources corresponding to a set of radio resource control states. In some examples, the resource configuration receiver 810 may first time resources different from a common set of time resources shared by the first uplink data portion and the second data uplink portion; or first frequency resources different from a common set of frequency resources shared by the first uplink data portion and the second data uplink portion; or first space resources different from a common set of space resources shared by the first uplink data portion and the second data uplink portion; or a combination thereof. In some examples, the resource configuration receiver 810 may receive system information, or radio resource control signaling, or a paging signal, or a combination thereof, including the indication of the resource configuration. In some cases, the set of sets of transmission resources include at least a first set of transmission resources and a second set of transmissions resources, the first set of transmission resources include a first uplink data portion corresponding to a first subset of a preamble portion, and the second set of transmission resources include a second uplink data portion corresponding to a second subset of the preamble portion. In some cases, the first uplink data portion of the first set of transmission resources and the second uplink data portion of the second set of transmission resources share a common set of frequency resources. In some cases, the first uplink data portion of the first set of transmission resources and the second uplink data portion of the second set of transmission resources share a common set of time resources. In some cases, the first uplink data portion of the first set of transmission resources and the second uplink data portion of the second set of transmission resources share a common set of space resources. In some cases, the preamble portion shares a common set of time resources, or a common set of frequency resources, or a common set of space resources, or a combination thereof, with the first uplink data portion and the second uplink data portion. In some cases, the set of sets of transmission resources include time resources, or frequency resources, or spatial resources, or a combination thereof The UE RRC state identifier 815 may identify a radio resource control state of the UE. In some examples, the UE RRC state identifier 815 may identify at least one transmission parameter to be used by the UE to transmit the first message, where the set of transmission resources is determined based on the indication of the resource configuration, the identified radio resource control state, and the at least one transmission parameter. In some examples, the UE RRC state identifier 815 may determine a UE identifier of the UE based on the identified radio resource control state of the UE, where the set of transmission resources is determined based on the indication of the resource configuration, the identified radio resource control state, and the identifier of the UE. In some examples, the UE RRC state identifier 815 may determine a UE identifier of the UE based on the identified radio resource control state of the UE. In some examples, the UE RRC state identifier 815 may identify that the UE is operating in one of a radio resource control inactive state, or a radio resource control connected state, or a radio resource control idle state.

The transmission resource determiner 820 may determine a set of transmission resources based on the indication of the resource configuration, a transport format, and the identified radio resource control state.

The first message transmitter 825 may transmit a first message of the random access procedure to the base station using the determined transmission resources. In some examples, the first message transmitter 825 may identify that the UE lacks a valid timing advance value for the random access procedure, where the first message is transmitted regardless of the UE lacking the valid timing advance value.

The second message monitoring component 830 may monitor, based on the determined UE identifier, for a second message of the random access procedure transmitted by the base station in response to the transmitted first message. In some examples, the second message monitoring component 830 may determine a search space for a control region of the second message based on the identified radio resource control state of the UE, where the monitoring is further based on the determined search space. In some examples, the second message monitoring component 830 may determine a time duration for at least a portion of the second message based on the identified radio resource control state of the UE, where the monitoring is further based on the determined time duration. In some examples, the second message monitoring component 830 may receive, in response to the transmitted first message, the second message of the two-step random access procedure.

Figure 9:
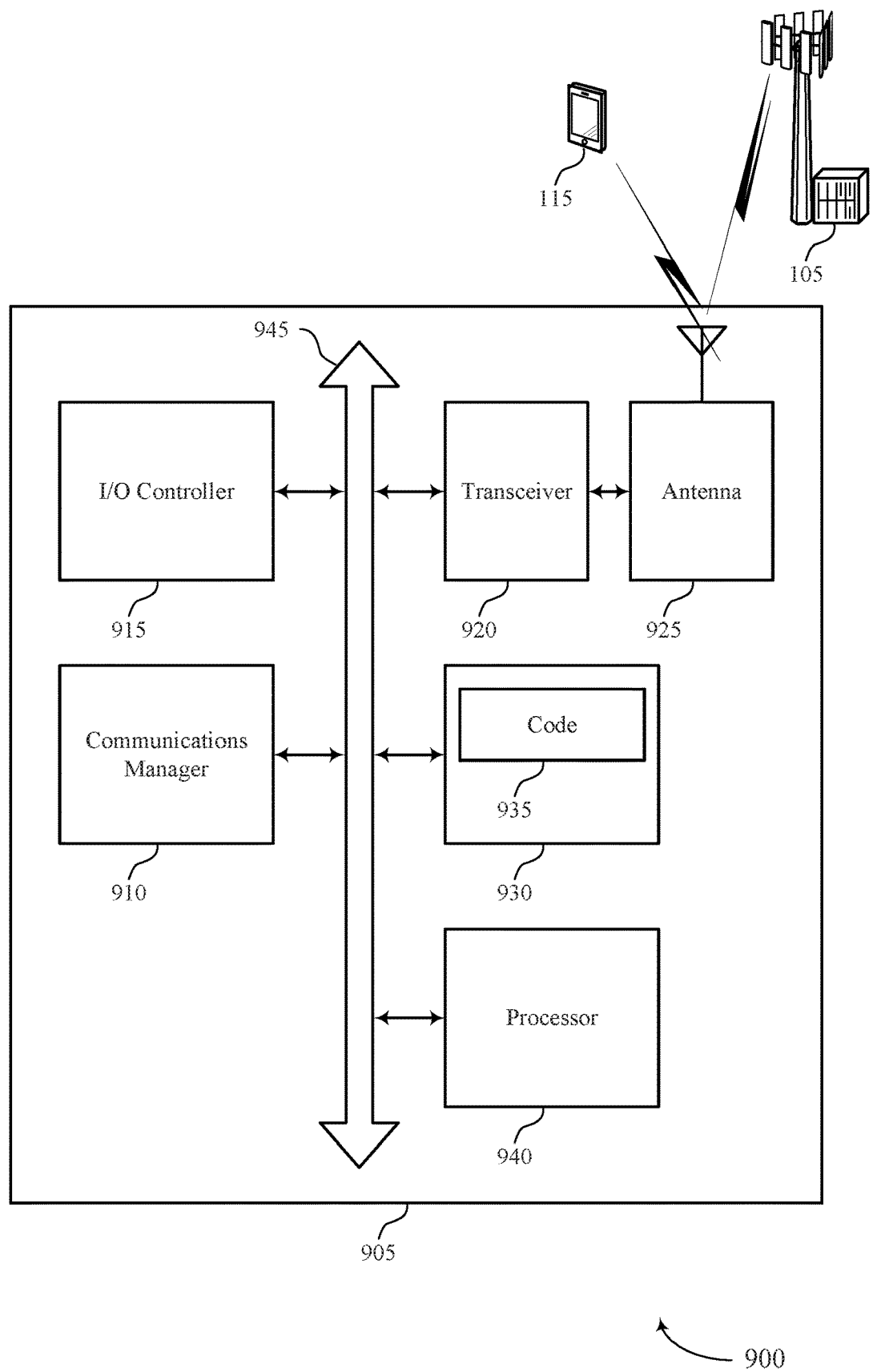
FIG. 9 shows a diagram of a system including a device that supports signaling support and resource mapping for two-step random access in accordance with aspects of the present disclosure.

FIG. 9 shows a diagram of a system 900 including a device 905 that supports signaling support and resource mapping for two-step random access in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may receive, from a base station, an indication of a resource configuration for a random access procedure, the resource configuration identifying a set of sets of transmission resources corresponding to a set of radio resource control states, identify a radio resource control state of the UE, determine a set of transmission resources based on the indication of the resource configuration and the identified radio resource control state, and transmit a first message of the random access procedure to the base station using the determined transmission resources.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include RAM and ROM. The memory 930 may store computer-readable, computer-executable code 935 including instructions that, when executed, cause the processor to perform various functions described herein. In some cases, the memory 930 may contain, among other things, a basic input/output system (BIOS) which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting signaling support and resource mapping for two-step random access).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
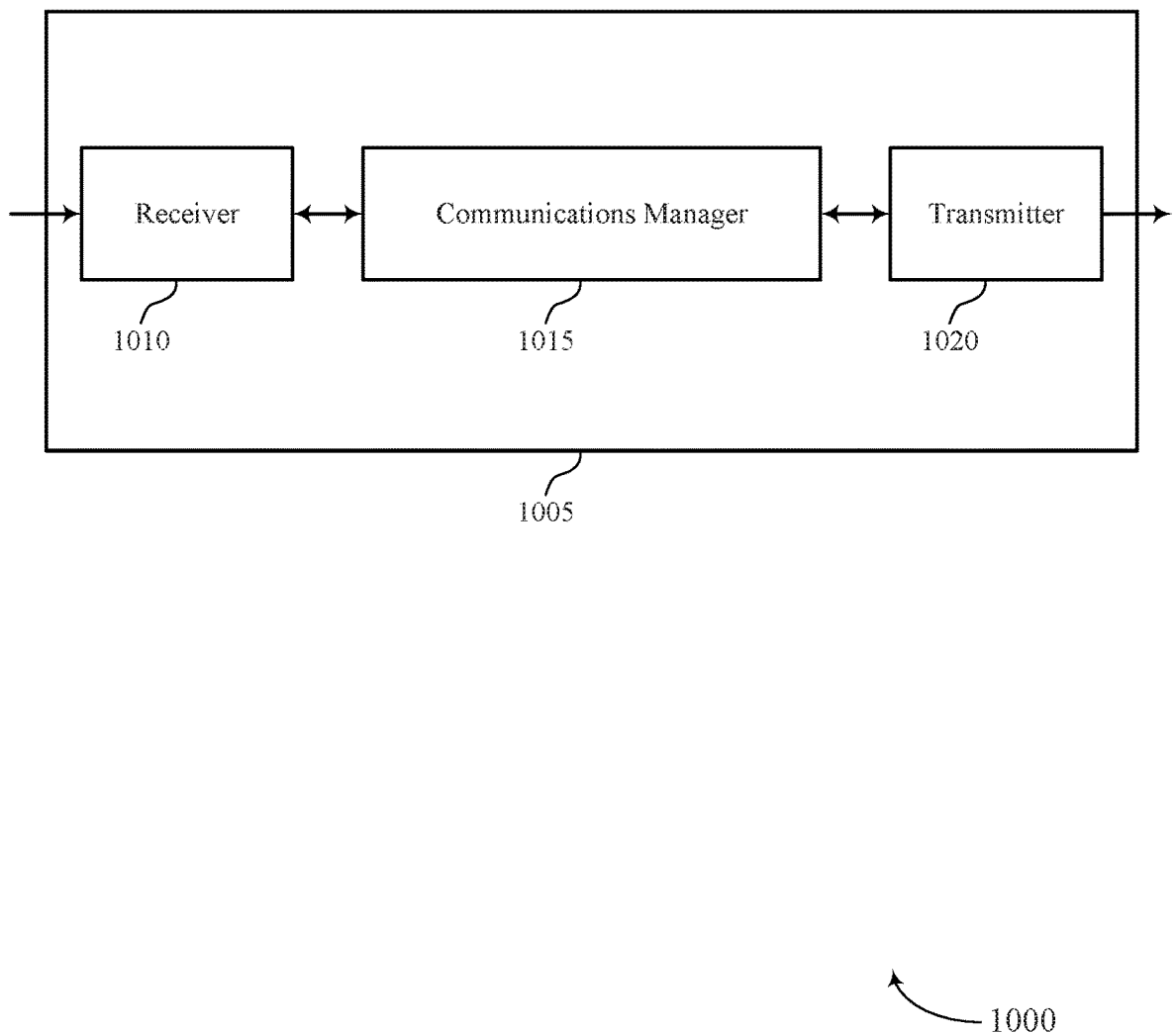
FIGS. 10 and 11 show block diagrams of devices that support signaling support and resource mapping for two-step random access in accordance with aspects of the present disclosure.

FIG. 10 shows a block diagram 1000 of a device 1005 that supports signaling support and resource mapping for two-step random access in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to signaling support and resource mapping for two-step random access, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may transmit, to a UE, an indication of a resource configuration for a random access procedure, the resource configuration identifying a set of sets of transmission resources corresponding to a set of radio resource control states, receive, from the UE, a first message of the random access procedure, identify a radio resource control state of the UE based on the received first message of the random access procedure and the transmitted indication of the resource configuration, and transmit, to the UE based on the identified radio resource control state of the UE, a second message of the random access procedure in response to the received first message. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
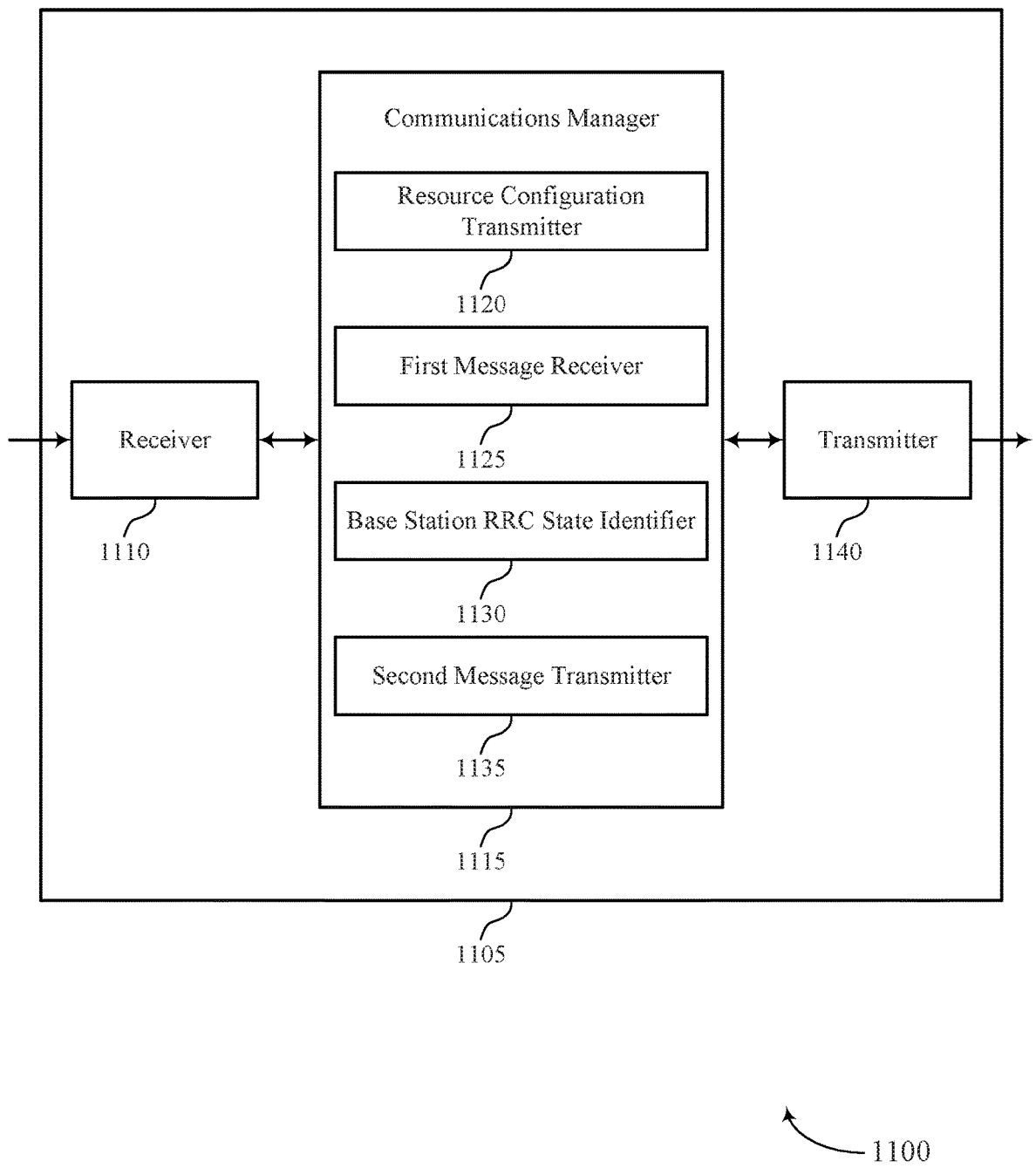

FIG. 11 shows a block diagram 1100 of a device 1105 that supports signaling support and resource mapping for two-step random access in accordance with aspects of the present disclosure. The device 1105 may be an example of aspects of a device 1005, or a base station 105 as described herein. The device 1105 may include a receiver 1110, a communications manager 1115, and a transmitter 1140. The device 1105 may also include a processor. Each of these components may be in communication with one another (e.g., via one or more buses).

The receiver 1110 may receive information such as packets, user data, or control information associated with various information channels (e.g., control channels, data channels, and information related to signaling support and resource mapping for two-step random access, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a resource configuration transmitter 1120, a first message receiver 1125, a base station RRC state identifier 1130, and a second message transmitter 1135. The communications manager 1115 may be an example of aspects of the communications manager 1310 described herein.

The resource configuration transmitter 1120 may transmit, to a UE, an indication of a resource configuration for a random access procedure, the resource configuration identifying a set of sets of transmission resources corresponding to a set of radio resource control states.

The first message receiver 1125 may receive, from the UE, a first message of the random access procedure.

The base station RRC state identifier 1130 may identify a radio resource control state of the UE based on the received first message of the random access procedure and the transmitted indication of the resource configuration.

The second message transmitter 1135 may transmit, to the UE based on the identified radio resource control state of the UE, a second message of the random access procedure in response to the received first message.

The transmitter 1140 may transmit signals generated by other components of the device 1105. In some examples, the transmitter 1140 may be collocated with a receiver 1110 in a transceiver module. For example, the transmitter 1140 may be an example of aspects of the transceiver 1320 described with reference to FIG. 13. The transmitter 1140 may utilize a single antenna or a set of antennas.

Figure 12:
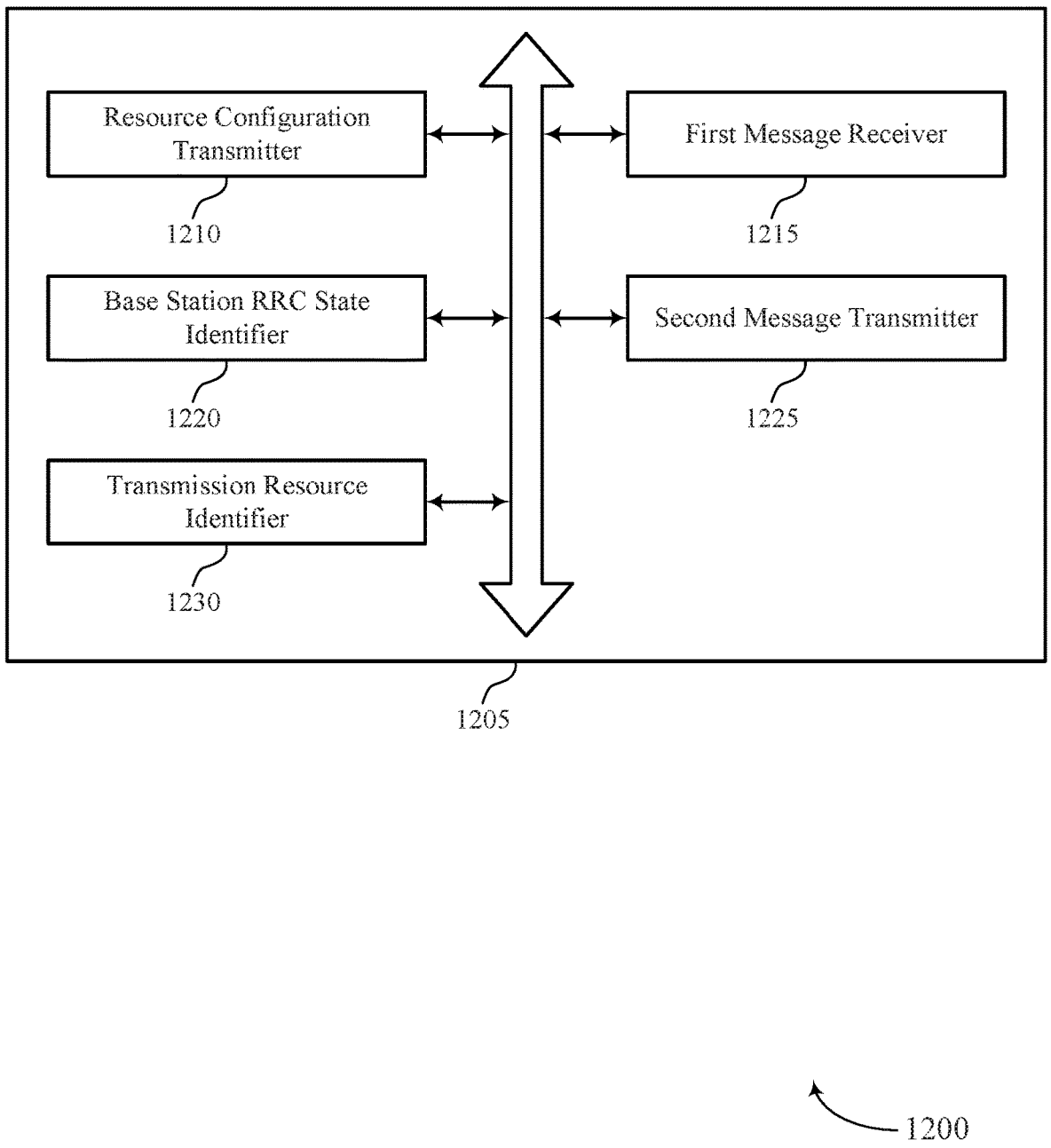
FIG. 12 shows a block diagram of a communications manager that supports signaling support and resource mapping for two-step random access in accordance with aspects of the present disclosure.

FIG. 12 shows a block diagram 1200 of a communications manager 1205 that supports signaling support and resource mapping for two-step random access in accordance with aspects of the present disclosure. The communications manager 1205 may be an example of aspects of a communications manager 1015, a communications manager 1115, or a communications manager 1310 described herein. The communications manager 1205 may include a resource configuration transmitter 1210, a first message receiver 1215, a base station RRC state identifier 1220, a second message transmitter 1225, and a transmission resource identifier 1230. Each of these modules may communicate, directly or indirectly, with one another (e.g., via one or more buses).

The resource configuration transmitter 1210 may transmit, to a UE, an indication of a resource configuration for a random access procedure, the resource configuration identifying a set of sets of transmission resources corresponding to a set of radio resource control states. In some examples, the resource configuration transmitter 1210 may transmit system information, or radio resource control signaling, or a paging signal, or a combination thereof, including the indication of the resource configuration. In some cases, the set of sets of transmission resources include time resources, or frequency resources, or spatial resources, or a combination thereof. In some cases, the random access procedure is a two-step random access procedure that includes the first message and the second message.

The first message receiver 1215 may receive, from the UE, a first message of the random access procedure.

The base station RRC state identifier 1220 may identify a radio resource control state of the UE based on the received first message of the random access procedure and the transmitted indication of the resource configuration. In some examples, the base station RRC state identifier 1220 may identify at least one transmission parameter used by the UE to transmit the first message, where the radio resource control state is identified based on the identified at least one transmission parameter. In some examples, the base station RRC state identifier 1220 may determine a UE identifier based on the first message. In some examples, the base station RRC state identifier 1220 may identify that the UE is operating in one of a radio resource control inactive state, or a radio resource control connected state, or an radio resource control idle state.

The second message transmitter 1225 may transmit, to the UE based on the identified radio resource control state of the UE, a second message of the random access procedure in response to the received first message.

The transmission resource identifier 1230 may identify a first set of transmission resources of the set of sets of transmission resources for the second message based on the UE identifier and the identified radio resource control state.

Figure 13:
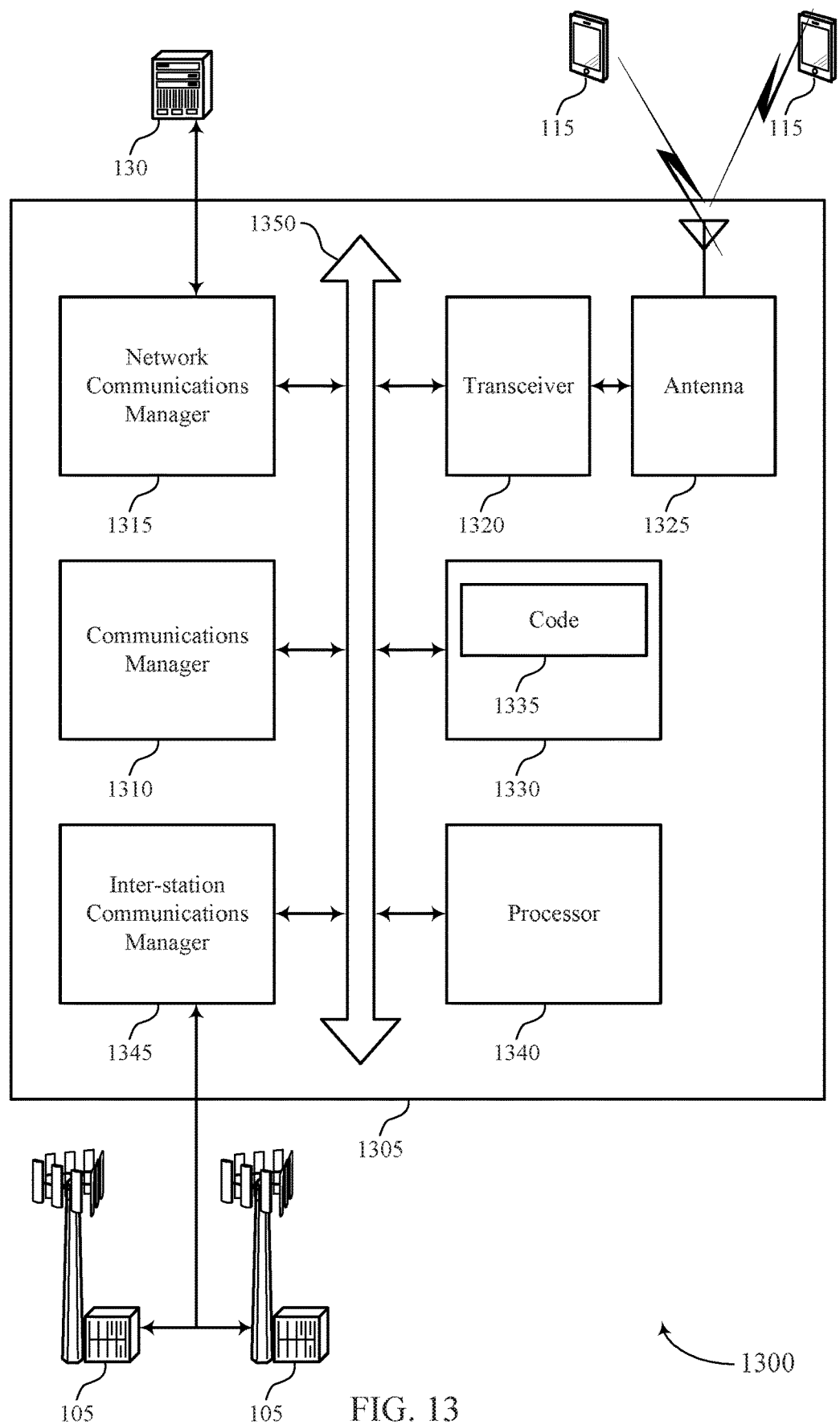
FIG. 13 shows a diagram of a system including a device that supports signaling support and resource mapping for two-step random access in accordance with aspects of the present disclosure.

FIG. 13 shows a diagram of a system 1300 including a device 1305 that supports signaling support and resource mapping for two-step random access in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may transmit, to a UE, an indication of a resource configuration for a random access procedure, the resource configuration identifying a set of sets of transmission resources corresponding to a set of radio resource control states, receive, from the UE, a first message of the random access procedure, identify a radio resource control state of the UE based on the received first message of the random access procedure and the transmitted indication of the resource configuration, and transmit, to the UE based on the identified radio resource control state of the UE, a second message of the random access procedure in response to the received first message.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting signaling support and resource mapping for two-step random access).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
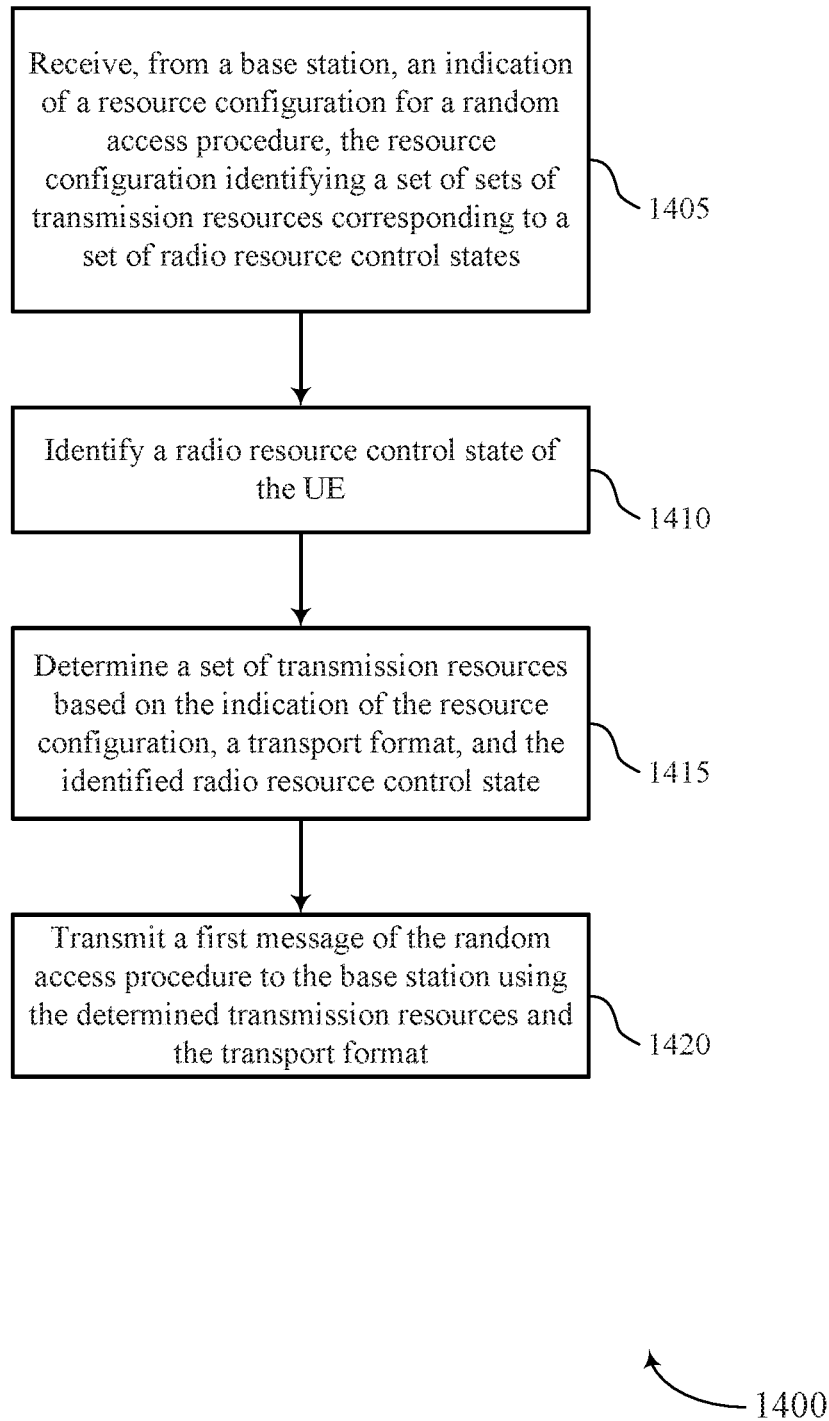
FIGS. 14 through 18 show flowcharts illustrating methods that support signaling support and resource mapping for two-step random access in accordance with aspects of the present disclosure.

FIG. 14 shows a flowchart illustrating a method 1400 that supports signaling support and resource mapping for two-step random access in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1405, the UE may receive, from a base station, an indication of a resource configuration for a random access procedure, the resource configuration identifying a set of sets of transmission resources corresponding to a set of radio resource control states. The operations of 1405 may be performed according to the methods described herein. In some examples, aspects of the operations of 1405 may be performed by a resource configuration receiver as described with reference to FIGS. 6 through 9.

At 1410, the UE may identify a radio resource control state of the UE. The operations of 1410 may be performed according to the methods described herein. In some examples, aspects of the operations of 1410 may be performed by an UE RRC state identifier as described with reference to FIGS. 6 through 9.

At 1415, the UE may determine a set of transmission resources based on the indication of the resource configuration, a transport format, and the identified radio resource control state. The operations of 1415 may be performed according to the methods described herein. In some examples, aspects of the operations of 1415 may be performed by a transmission resource determiner as described with reference to FIGS. 6 through 9.

At 1420, the UE may transmit a first message of the random access procedure to the base station using the determined transmission resource and the transport format. The operations of 1420 may be performed according to the methods described herein. In some examples, aspects of the operations of 1420 may be performed by a first message transmitter as described with reference to FIGS. 6 through 9.

Figure 15:
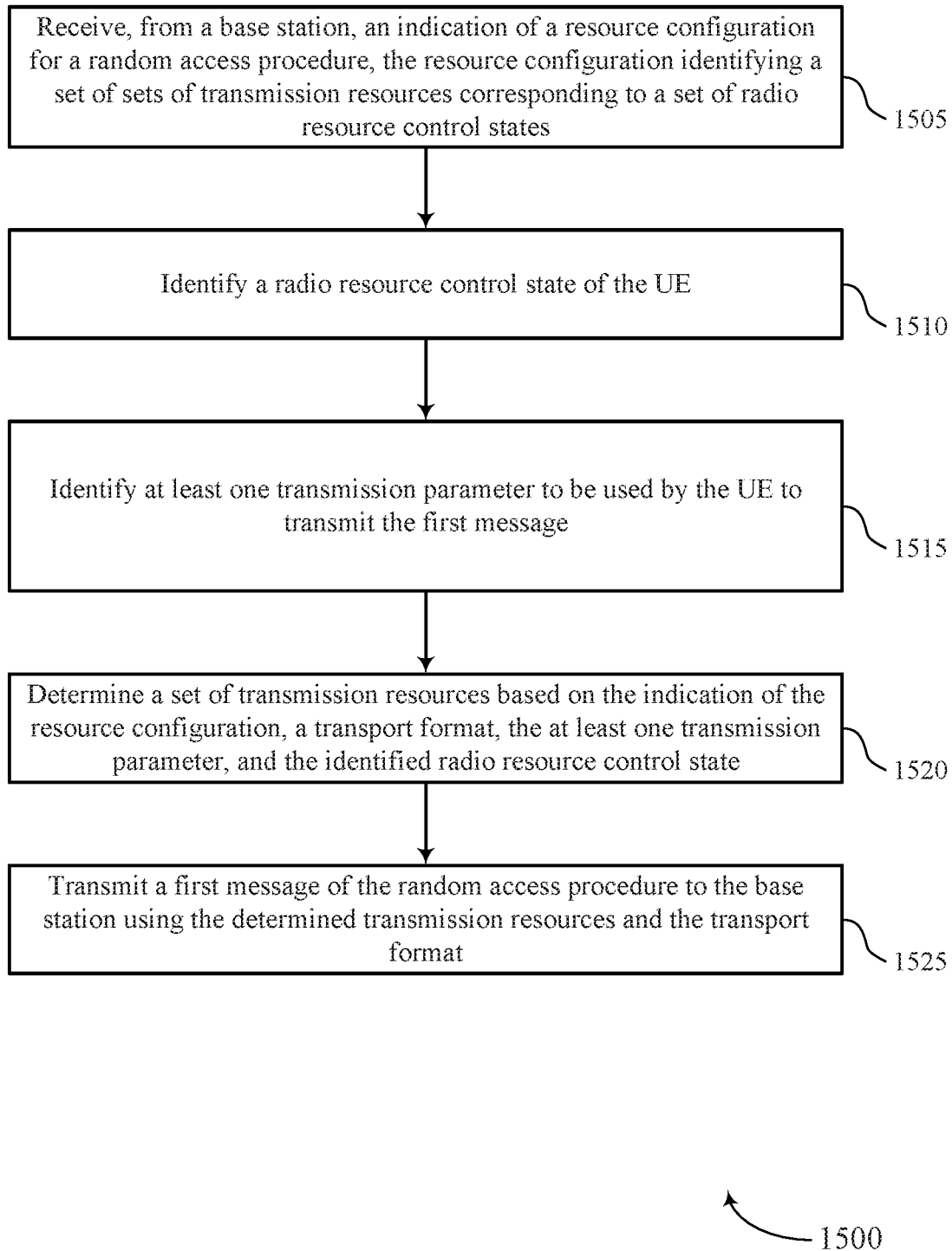

FIG. 15 shows a flowchart illustrating a method 1500 that supports signaling support and resource mapping for two-step random access in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1505, the UE may receive, from a base station, an indication of a resource configuration for a random access procedure, the resource configuration identifying a set of sets of transmission resources corresponding to a set of radio resource control states. The operations of 1505 may be performed according to the methods described herein. In some examples, aspects of the operations of 1505 may be performed by a resource configuration receiver as described with reference to FIGS. 6 through 9.

At 1510, the UE may identify a radio resource control state of the UE. The operations of 1510 may be performed according to the methods described herein. In some examples, aspects of the operations of 1510 may be performed by an UE RRC state identifier as described with reference to FIGS. 6 through 9.

At 1515, the UE may identify at least one transmission parameter to be used by the UE to transmit the first message. The operations of 1515 may be performed according to the methods described herein. In some examples, aspects of the operations of 1515 may be performed by an UE RRC state identifier as described with reference to FIGS. 6 through 9.

At 1520, the UE may determine a set of transmission resources based on the indication of the resource configuration, a transport format, the at least one transmission parameter, and the identified radio resource control state. The operations of 1520 may be performed according to the methods described herein. In some examples, aspects of the operations of 1520 may be performed by a transmission resource determiner as described with reference to FIGS. 6 through 9.

At 1525, the UE may transmit a first message of the random access procedure to the base station using the determined transmission resources and the transport format. The operations of 1525 may be performed according to the methods described herein. In some examples, aspects of the operations of 1525 may be performed by a first message transmitter as described with reference to FIGS. 6 through 9.

Figure 16:
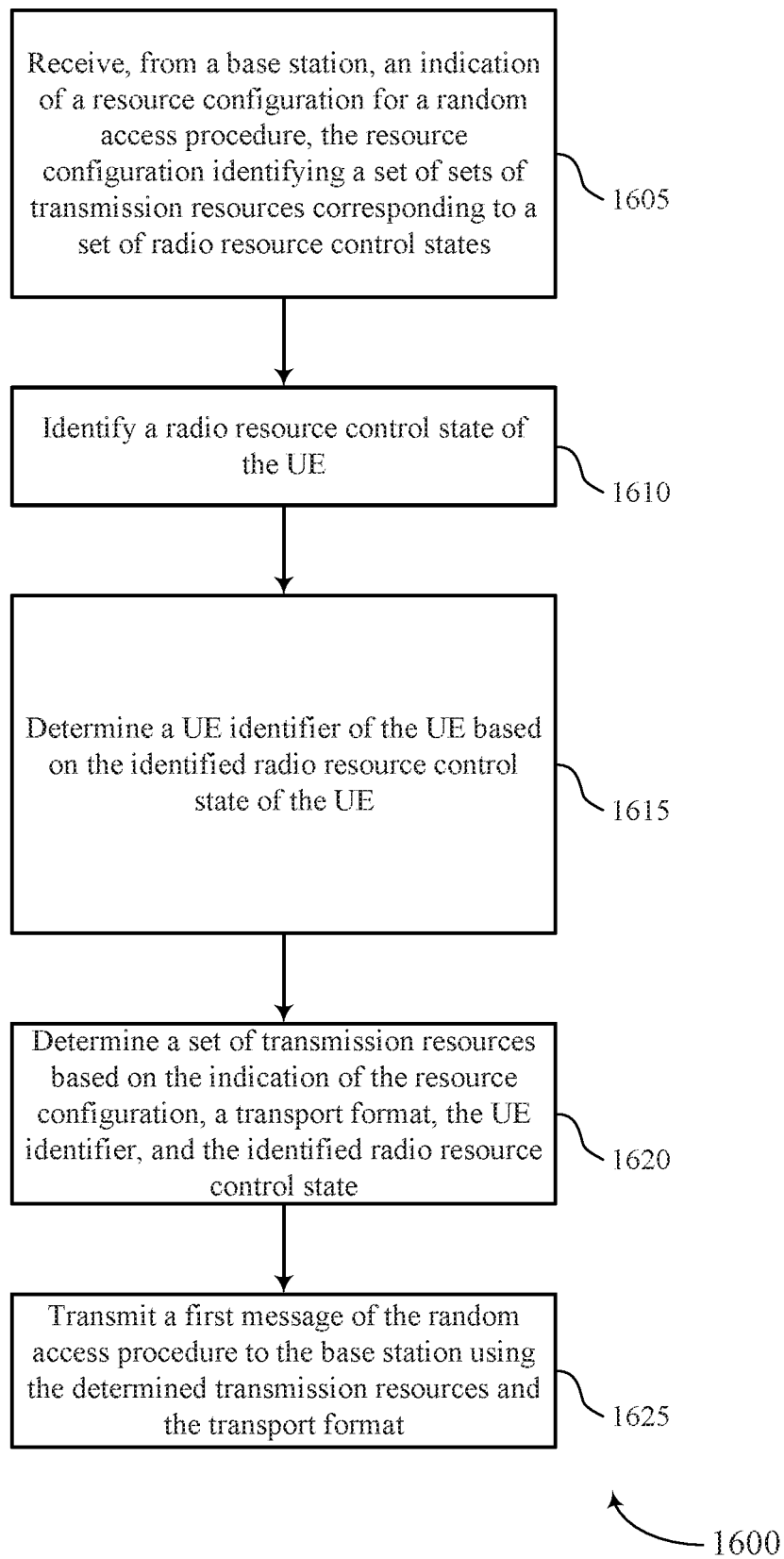

FIG. 16 shows a flowchart illustrating a method 1600 that supports signaling support and resource mapping for two-step random access in accordance with aspects of the present disclosure. The operations of method 1600 may be implemented by a UE 115 or its components as described herein. For example, the operations of method 1600 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1605, the UE may receive, from a base station, an indication of a resource configuration for a random access procedure, the resource configuration identifying a set of sets of transmission resources corresponding to a set of radio resource control states. The operations of 1605 may be performed according to the methods described herein. In some examples, aspects of the operations of 1605 may be performed by a resource configuration receiver as described with reference to FIGS. 6 through 9.

At 1610, the UE may identify a radio resource control state of the UE. The operations of 1610 may be performed according to the methods described herein. In some examples, aspects of the operations of 1610 may be performed by an UE RRC state identifier as described with reference to FIGS. 6 through 9.

At 1615, the UE may determine a UE identifier of the UE based on the identified radio resource control state of the UE. The operations of 1615 may be performed according to the methods described herein. In some examples, aspects of the operations of 1615 may be performed by an UE RRC state identifier as described with reference to FIGS. 6 through 9.

At 1620, the UE may determine a set of transmission resources based on the indication of the resource configuration, a transport format, the UE identifier, and the identified radio resource control state. The operations of 1620 may be performed according to the methods described herein. In some examples, aspects of the operations of 1620 may be performed by a transmission resource determiner as described with reference to FIGS. 6 through 9.

At 1625, the UE may transmit a first message of the random access procedure to the base station using the determined transmission resources and the transport format. The operations of 1625 may be performed according to the methods described herein. In some examples, aspects of the operations of 1625 may be performed by a first message transmitter as described with reference to FIGS. 6 through 9.

Figure 17:
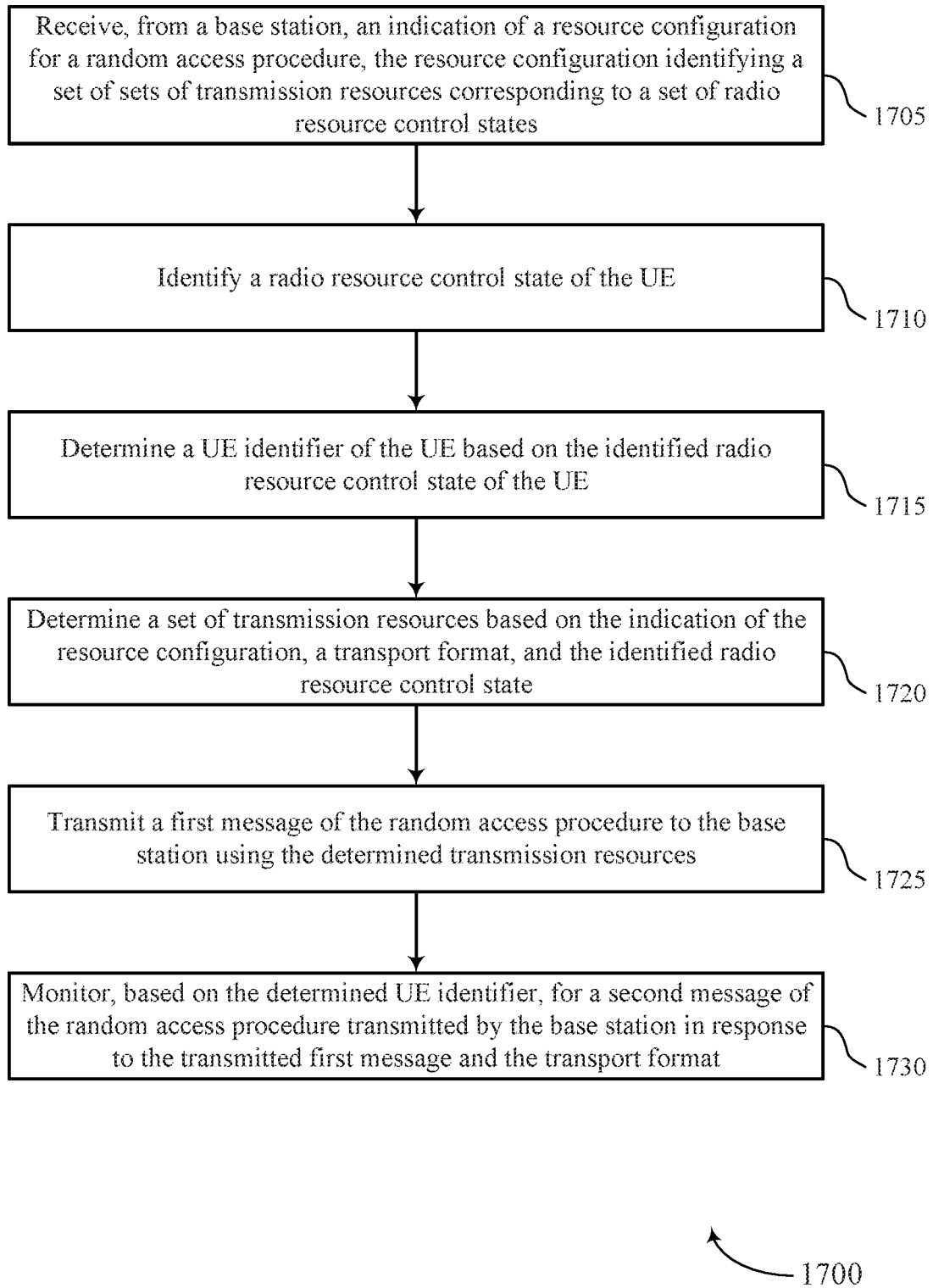

FIG. 17 shows a flowchart illustrating a method 1700 that supports signaling support and resource mapping for two-step random access in accordance with aspects of the present disclosure. The operations of method 1700 may be implemented by a UE 115 or its components as described herein. For example, the operations of method 1700 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1705, the UE may receive, from a base station, an indication of a resource configuration for a random access procedure, the resource configuration identifying a set of sets of transmission resources corresponding to a set of radio resource control states. The operations of 1705 may be performed according to the methods described herein. In some examples, aspects of the operations of 1705 may be performed by a resource configuration receiver as described with reference to FIGS. 6 through 9.

At 1710, the UE may identify a radio resource control state of the UE. The operations of 1710 may be performed according to the methods described herein. In some examples, aspects of the operations of 1710 may be performed by an UE RRC state identifier as described with reference to FIGS. 6 through 9.

At 1715, the UE may determine a UE identifier of the UE based on the identified radio resource control state of the UE. The operations of 1715 may be performed according to the methods described herein. In some examples, aspects of the operations of 1715 may be performed by an UE RRC state identifier as described with reference to FIGS. 6 through 9.

At 1720, the UE may determine a set of transmission resources based on the indication of the resource configuration, a transport format, and the identified radio resource control state. The operations of 1720 may be performed according to the methods described herein. In some examples, aspects of the operations of 1720 may be performed by a transmission resource determiner as described with reference to FIGS. 6 through 9.

At 1725, the UE may transmit a first message of the random access procedure to the base station using the determined transmission resources and the transport format. The operations of 1725 may be performed according to the methods described herein. In some examples, aspects of the operations of 1725 may be performed by a first message transmitter as described with reference to FIGS. 6 through 9.

At 1730, the UE may monitor, based on the determined UE identifier, for a second message of the random access procedure transmitted by the base station in response to the transmitted first message. The operations of 1730 may be performed according to the methods described herein. In some examples, aspects of the operations of 1730 may be performed by a second message monitoring component as described with reference to FIGS. 6 through 9.

Figure 18:
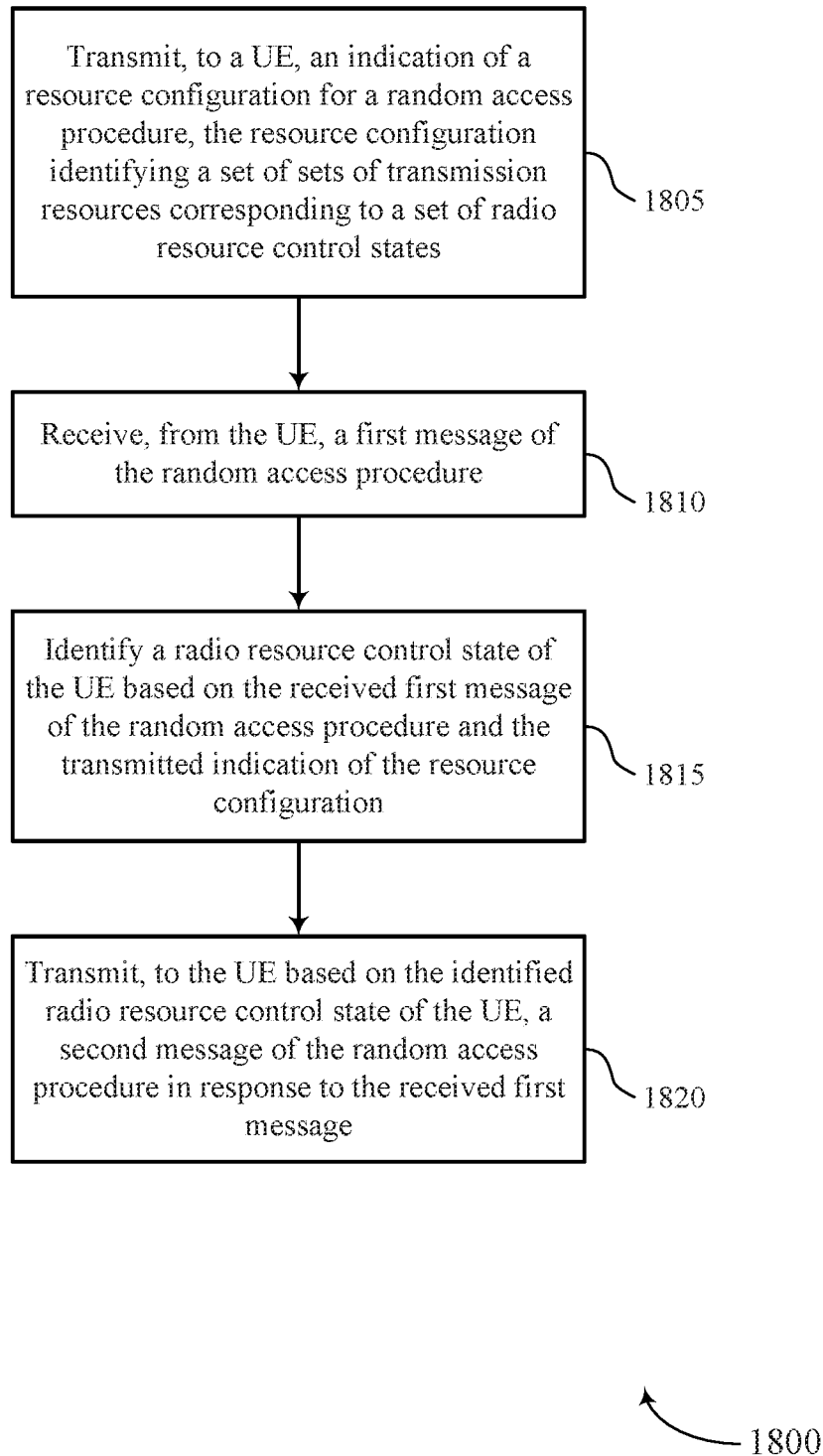

FIG. 18 shows a flowchart illustrating a method 1800 that supports signaling support and resource mapping for two-step random access in accordance with aspects of the present disclosure. The operations of method 1800 may be implemented by a base station 105 or its components as described herein. For example, the operations of method 1800 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1805, the base station may transmit, to a UE, an indication of a resource configuration for a random access procedure, the resource configuration identifying a set of sets of transmission resources corresponding to a set of radio resource control states. The operations of 1805 may be performed according to the methods described herein. In some examples, aspects of the operations of 1805 may be performed by a resource configuration transmitter as described with reference to FIGS. 10 through 13.

At 1810, the base station may receive, from the UE, a first message of the random access procedure. The operations of 1810 may be performed according to the methods described herein. In some examples, aspects of the operations of 1810 may be performed by a first message receiver as described with reference to FIGS. 10 through 13.

At 1815, the base station may identify a radio resource control state of the UE based on the received first message of the random access procedure and the transmitted indication of the resource configuration. The operations of 1815 may be performed according to the methods described herein. In some examples, aspects of the operations of 1815 may be performed by a base station RRC state identifier as described with reference to FIGS. 10 through 13.

At 1820, the base station may transmit, to the UE based on the identified radio resource control state of the UE, a second message of the random access procedure in response to the received first message. The operations of 1820 may be performed according to the methods described herein. In some examples, aspects of the operations of 1820 may be performed by a second message transmitter as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   receiving, from a base station, an indication of a resource configuration for a random access procedure, the resource configuration identifying a plurality of sets of transmission resources corresponding to a plurality of radio resource control states;
   identifying a radio resource control state of the UE;
   determining a set of transmission resources based at least in part on the indication of the resource configuration, a transport format, and the identified radio resource control state; and
   transmitting a first message of the random access procedure to the base station using the determined transmission resources and the transport format.

2. The method of claim 1, further comprising:
   identifying at least one transmission parameter to be used by the UE to transmit the first message, wherein the set of transmission resources is determined based at least in part on the indication of the resource configuration, the transport format, the identified radio resource control state, and the at least one transmission parameter.

3. The method of claim 1, further comprising:
   determining a UE identifier of the UE based at least in part on the identified radio resource control state of the UE; and
   monitoring, based at least in part on the determined UE identifier, for a second message of the random access procedure transmitted by the base station in response to the transmitted first message.

4. The method of claim 1, wherein the plurality of sets of transmission resources comprise at least a first set of transmission resources and a second set of transmissions resources, the first set of transmission resources comprise a first uplink data portion corresponding to a first subset of a preamble portion, and the second set of transmission resources comprise a second uplink data portion corresponding to a second subset of the preamble portion.

5. The method of claim 1, wherein identifying the radio resource control state of the UE comprises:
   identifying that the UE is operating in one of a radio resource control inactive state, or a radio resource control connected state, or a radio resource control idle state.

6. The method of claim 1, wherein receiving the indication of the resource configuration for the random access procedure comprises:
   receiving system information, or radio resource control signaling, or a paging signal, or a combination thereof, comprising the indication of the resource configuration.

7. The method of claim 1, wherein the plurality of sets of transmission resources comprise time resources, or frequency resources, or spatial resources, or a combination thereof.

8. The method of claim 1, wherein the random access procedure is a two-step random access procedure that comprises the first message and a second message, the method further comprising:
   receiving, in response to the transmitted first message, the second message of the two-step random access procedure.

9. The method of claim 1, further comprising:
   identifying that the UE lacks a valid timing advance value for the random access procedure, wherein the first message is transmitted regardless of the UE lacking the valid timing advance value.

10. A method comprising for wireless communication at a base station, comprising:
    transmitting, to a user equipment (UE), an indication of a resource configuration for a random access procedure, the resource configuration identifying a plurality of sets of transmission resources corresponding to a plurality of radio resource control states;
    receiving, from the UE, a first message of the random access procedure;
    identifying a radio resource control state of the UE based at least in part on the received first message of the random access procedure and the transmitted indication of the resource configuration; and
    transmitting, to the UE based at least in part on the identified radio resource control state of the UE, a second message of the random access procedure in response to the received first message.

11. An apparatus for wireless communication at a user equipment (UE), comprising:
a processor,
memory in electronic communication with the processor; and
instructions stored in the memory and executable by the processor to cause the apparatus to:
receive, from a base station, an indication of a resource configuration for a random access procedure, the resource configuration identifying a plurality of sets of transmission resources corresponding to a plurality of radio resource control states;
identify a radio resource control state of the UE;
determine a set of transmission resources based at least in part on the indication of the resource configuration, a transport format, and the identified radio resource control state; and
transmit a first message of the random access procedure to the base station using the determined transmission resources and the transport format.

12. The apparatus of claim 11, wherein the instructions are further executable by the processor to cause the apparatus to:
identify at least one transmission parameter to be used by the UE to transmit the first message, wherein the set of transmission resources is determined based at least in part on the indication of the resource configuration, the transport format, the identified radio resource control state, and the at least one transmission parameter.

13. The apparatus of claim 11, wherein the instructions are further executable by the processor to cause the apparatus to:
determine a UE identifier of the UE based at least in part on the identified radio resource control state of the UE, wherein the set of transmission resources is determined based at least in part on the indication of the resource configuration, the transport format, the identified radio resource control state, and the identifier of the UE.

14. The apparatus of claim 11, wherein the instructions are further executable by the processor to cause the apparatus to:
determine a UE identifier of the UE based at least in part on the identified radio resource control state of the UE; and
monitor, based at least in part on the determined UE identifier, for a second message of the random access procedure transmitted by the base station in response to the transmitted first message.

15. The apparatus of claim 14, wherein the instructions are further executable by the processor to cause the apparatus to:
determine a search space for a control region of the second message based at least in part on the identified radio resource control state of the UE, wherein the monitoring is further based on the determined search space.

16. The apparatus of claim 14, wherein the instructions are further executable by the processor to cause the apparatus to:
determine a time duration for at least a portion of the second message based at least in part on the identified radio resource control state of the UE, wherein the monitoring is further based on the determined time duration.

17. The apparatus of claim 11, wherein the plurality of sets of transmission resources comprise at least a first set of transmission resources and a second set of transmissions resources, the first set of transmission resources comprise a first uplink data portion corresponding to a first subset of a preamble portion, and the second set of transmission resources comprise a second uplink data portion corresponding to a second subset of the preamble portion.

18. The apparatus of claim 17, wherein the first uplink data portion of the first set of transmission resources and the second uplink data portion of the second set of transmission resources share a common set of frequency resources.

19. The apparatus of claim 17, wherein the first uplink data portion of the first set of transmission resources and the second uplink data portion of the second set of transmission resources share a common set of time resources.

20. The apparatus of claim 17, wherein the first uplink data portion of the first set of transmission resources and the second uplink data portion of the second set of transmission resources share a common set of space resources.

21. The apparatus of claim 17, wherein the preamble portion comprises:
first time resources different from a common set of time resources shared by the first uplink data portion and the second data uplink portion; or first frequency resources different from a common set of frequency resources shared by the first uplink data portion and the second data uplink portion; or first space resources different from a common set of space resources shared by the first uplink data portion and the second data uplink portion; or a combination thereof.

22. The apparatus of claim 17, wherein the preamble portion shares a common set of time resources, or a common set of frequency resources, or a common set of space resources, or a combination thereof, with the first uplink data portion and the second uplink data portion.

23. The apparatus of claim 11, wherein the instructions to identify the radio resource control state of the UE are executable by the processor to cause the apparatus to:
identify that the UE is operating in one of a radio resource control inactive state, or a radio resource control connected state, or a radio resource control idle state.

24. The apparatus of claim 11, wherein the instructions to receive the indication of the resource configuration for the random access procedure are executable by the processor to cause the apparatus to:
receive system information, or radio resource control signaling, or a paging signal, or a combination thereof, comprising the indication of the resource configuration.

25. The apparatus of claim 11, wherein the plurality of sets of transmission resources comprise time resources, or frequency resources, or spatial resources, or a combination thereof.

26. The apparatus of claim 11, wherein the random access procedure is a two-step random access procedure that comprises the first message and a second message, and the instructions are further executable by the processor to cause the apparatus to:
receive, in response to the transmitted first message, the second message of the two-step random access procedure.

27. The apparatus of claim 11, wherein the instructions are further executable by the processor to cause the apparatus to:
identify that the UE lacks a valid timing advance value for the random access procedure, wherein the first message is transmitted regardless of the UE lacking the valid timing advance value.

28. An apparatus for wireless communication at a base station, comprising:
a processor,
memory in electronic communication with the processor; and instructions stored in the memory and executable by the processor to cause the apparatus to:
  transmit, to a user equipment (UE), an indication of a resource configuration for a random access procedure, the resource configuration identifying a plurality of sets of transmission resources corresponding to a plurality of radio resource control states;
  receive, from the UE, a first message of the random access procedure;
  identify a radio resource control state of the UE based at least in part on the received first message of the random access procedure and the transmitted indication of the resource configuration; and
  transmit, to the UE based at least in part on the identified radio resource control state of the UE, a second message of the random access procedure in response to the received first message.

29. The apparatus of claim 28, wherein the instructions are further executable by the processor to cause the apparatus to:
  identify at least one transmission parameter used by the UE to transmit the first message, wherein the radio resource control state is identified based at least in part on the identified at least one transmission parameter.

30. The apparatus of claim 28, wherein the instructions are further executable by the processor to cause the apparatus to:
  determine a UE identifier based at least in part on the first message; and
  identify a first set of transmission resources of the plurality of sets of transmission resources for the second message based at least in part on the UE identifier and the identified radio resource control state.

* * * * *